ns*US009293999B1*

United States Patent
Lam et al.

(10) Patent No.: US 9,293,999 B1
(45) Date of Patent: Mar. 22, 2016

(54) AUTOMATIC ENHANCED SELF-DRIVEN SYNCHRONOUS RECTIFICATION FOR POWER CONVERTERS

(71) Applicant: Crane Electronics, Inc., Redmond, WA (US)

(72) Inventors: Cuon Lam, Renton, WA (US); Sovann Song, Bothell, WA (US); Khoa Nguyen, Seattle, WA (US); Herman Chen, Edmonds, WA (US)

(73) Assignee: Crane Electronics, Inc., Redmond, WA (US)

( * ) Notice: Subject to any disclaimer, the term of this patent is extended or adjusted under 35 U.S.C. 154(b) by 0 days.

(21) Appl. No.: 14/848,859

(22) Filed: Sep. 9, 2015

Related U.S. Application Data

(60) Provisional application No. 62/193,755, filed on Jul. 17, 2015.

(51) Int. Cl.
*H02M 3/335* (2006.01)

(52) U.S. Cl.
CPC ...... *H02M 3/33546* (2013.01); *H02M 3/33592* (2013.01); *H02M 3/33569* (2013.01); *H02M 3/33576* (2013.01)

(58) Field of Classification Search
CPC . H02M 3/33592; H02M 3/337; H02M 3/338; H02M 3/3385; H02M 7/02; H02M 7/04; H02M 7/043; H02M 7/12; H02M 7/155
USPC ......... 363/13, 15, 16, 20, 21.01, 21.04, 21.06
See application file for complete search history.

(56) References Cited

U.S. PATENT DOCUMENTS

| 3,144,627 A | 8/1964 | Dunnabeck et al. |
| 3,201,728 A | 8/1965 | McWhirter |

(Continued)

FOREIGN PATENT DOCUMENTS

| CN | 101326705 A | 12/2008 |
| CN | 201219235 Y | 4/2009 |

(Continued)

OTHER PUBLICATIONS

"EMI Suppression Filters (EMIFIL®) for AC Power Lines," Murata Manufacturing Co., Ltd., Cat.No. C09E-14, downloaded on Feb. 21, 2014, 27 pages.

(Continued)

*Primary Examiner* — Jessica Han
*Assistant Examiner* — David A Singh
(74) *Attorney, Agent, or Firm* — Seed IP Law Group PLLC

(57) ABSTRACT

Systems and methods for providing a self-driven synchronous rectification circuit for an active-clamp forward converter which includes automatically enhancing synchronous MOSFETs and maximizing input voltage range. The gate signals for the synchronous MOSFETs are derived from a unipolar magnetic coupling signal instead of a bipolarized magnetic coupling signal. The unipolar signal is retained for fully enhanced driving of the MOSFETs at low line voltage and the unipolar signal is automatically converted to a bipolar signal at high line amplitude due to line variance to maximize input voltage range by utilizing non-polarized characteristics of the MOSFET gate-to-source voltage (Vgs). The circuit permits efficient scaling for higher output voltages such as 12 volts DC or 15 volts DC, without requiring extra windings on the transformer of the forward converter.

25 Claims, 14 Drawing Sheets

(56) References Cited

U.S. PATENT DOCUMENTS

| | | | |
|---|---|---|---|
| 4,128,868 A | 12/1978 | Gamble | |
| 4,255,784 A | 3/1981 | Rosa | |
| 4,337,569 A | 7/1982 | Pierce | |
| 4,482,945 A | 11/1984 | Wolf et al. | |
| 4,533,986 A | 8/1985 | Jones | |
| 4,618,812 A | 10/1986 | Kawakami | |
| 4,635,002 A | 1/1987 | Riebeek | |
| 4,683,527 A | 7/1987 | Rosa | |
| 4,719,552 A | 1/1988 | Albach et al. | |
| 4,743,835 A | 5/1988 | Bossé et al. | |
| 4,920,309 A | 4/1990 | Szepesi | |
| 4,956,626 A | 9/1990 | Hoppe et al. | |
| 4,992,919 A | 2/1991 | Lee et al. | |
| 5,068,774 A | 11/1991 | Rosa | |
| 5,148,357 A | 9/1992 | Paice | |
| 5,343,383 A * | 8/1994 | Shinada | H02M 3/33592 363/127 |
| 5,396,165 A | 3/1995 | Hwang et al. | |
| 5,418,502 A | 5/1995 | Ma et al. | |
| 5,430,640 A | 7/1995 | Lee | |
| 5,436,550 A | 7/1995 | Arakawa | |
| 5,469,124 A | 11/1995 | O'Donnell et al. | |
| 5,481,225 A | 1/1996 | Lumsden et al. | |
| 5,521,807 A | 5/1996 | Chen et al. | |
| 5,631,822 A | 5/1997 | Silberkleit et al. | |
| 5,638,262 A | 6/1997 | Brown | |
| 5,691,629 A | 11/1997 | Belnap | |
| 5,694,303 A | 12/1997 | Silberkleit et al. | |
| 5,708,571 A * | 1/1998 | Shinada | H02M 3/33592 363/16 |
| 5,734,563 A | 3/1998 | Shinada | |
| 5,774,347 A | 6/1998 | Nakanishi | |
| 5,831,418 A | 11/1998 | Kitagawa | |
| 5,903,504 A | 5/1999 | Chevallier et al. | |
| 6,002,183 A | 12/1999 | Iversen et al. | |
| 6,002,318 A | 12/1999 | Werner et al. | |
| 6,038,148 A | 3/2000 | Farrington et al. | |
| 6,043,705 A | 3/2000 | Jiang | |
| 6,091,616 A * | 7/2000 | Jacobs | H02M 3/33592 363/127 |
| 6,137,373 A | 10/2000 | Mori | |
| 6,141,232 A | 10/2000 | Weinmeier et al. | |
| 6,157,180 A | 12/2000 | Kuo | |
| 6,157,282 A | 12/2000 | Hopkinson | |
| 6,169,674 B1 | 1/2001 | Owen | |
| 6,198,647 B1 | 3/2001 | Zhou et al. | |
| 6,236,194 B1 | 5/2001 | Manabe et al. | |
| 6,252,781 B1 | 6/2001 | Rinne et al. | |
| 6,304,463 B1 | 10/2001 | Krugly | |
| 6,335,872 B1 | 1/2002 | Zhou et al. | |
| 6,343,026 B1 | 1/2002 | Perry | |
| 6,456,511 B1 | 9/2002 | Wong | |
| 6,469,478 B1 | 10/2002 | Curtin | |
| 6,472,852 B1 | 10/2002 | Lethellier | |
| 6,492,890 B1 | 12/2002 | Woznlczka | |
| 6,545,534 B1 | 4/2003 | Mehr | |
| 6,563,719 B1 * | 5/2003 | Hua | H02M 3/33592 363/127 |
| 6,643,151 B1 | 11/2003 | Nebrigic et al. | |
| 6,697,955 B1 | 2/2004 | Malik et al. | |
| 6,707,650 B2 | 3/2004 | Diallo et al. | |
| 6,760,235 B2 | 7/2004 | Lin et al. | |
| 6,798,177 B1 | 9/2004 | Liu et al. | |
| 6,839,246 B1 * | 1/2005 | Zhang | H02M 3/33592 363/127 |
| 6,850,048 B2 | 2/2005 | Orr et al. | |
| 6,998,901 B2 | 2/2006 | Lee | |
| 7,012,413 B1 | 3/2006 | Ye | |
| 7,061,212 B2 | 6/2006 | Phadke | |
| 7,095,215 B2 | 8/2006 | Liu et al. | |
| 7,129,808 B2 | 10/2006 | Roebke et al. | |
| 7,164,584 B2 | 1/2007 | Walz | |
| 7,183,727 B2 | 2/2007 | Ferguson et al. | |
| 7,199,563 B2 | 4/2007 | Ikezawa | |
| 7,202,644 B2 | 4/2007 | Nitta et al. | |
| 7,206,210 B2 | 4/2007 | Harnett et al. | |
| 7,227,754 B2 | 6/2007 | Greiesinger et al. | |
| 7,242,168 B2 | 7/2007 | Müller et al. | |
| 7,286,376 B2 | 10/2007 | Yang | |
| 7,304,828 B1 | 12/2007 | Shvartsman | |
| 7,339,804 B2 | 3/2008 | Uchida | |
| 7,369,024 B2 | 5/2008 | Yargole et al. | |
| 7,515,005 B2 | 4/2009 | Dan | |
| 7,564,706 B1 | 7/2009 | Herbert | |
| 7,577,539 B2 | 8/2009 | Hubanks et al. | |
| 7,579,901 B2 | 8/2009 | Yamashita | |
| 7,602,273 B2 | 10/2009 | Yoshikawa | |
| 7,616,459 B2 | 11/2009 | Huynh et al. | |
| 7,730,981 B2 | 6/2010 | McCabe et al. | |
| 7,742,318 B2 | 6/2010 | Fu et al. | |
| 7,786,712 B2 | 8/2010 | Williams | |
| 7,847,519 B2 | 12/2010 | Ho | |
| 7,884,317 B2 | 2/2011 | Casper | |
| 7,893,804 B2 | 2/2011 | Kaveh Ahangar et al. | |
| 8,009,004 B2 | 8/2011 | Ahangar et al. | |
| 8,040,699 B2 | 10/2011 | Huynh et al. | |
| 8,067,992 B2 | 11/2011 | Chen et al. | |
| 8,072,195 B2 | 12/2011 | Aan De Stegge et al. | |
| 8,102,162 B2 | 1/2012 | Moussaoui et al. | |
| 8,279,631 B2 | 10/2012 | Yang | |
| 8,358,118 B2 | 1/2013 | Chen et al. | |
| 8,378,647 B2 | 2/2013 | Yonezawa et al. | |
| 8,508,195 B2 | 8/2013 | Uno | |
| 8,520,415 B1 | 8/2013 | Krishnamoorthy et al. | |
| 8,552,589 B2 | 10/2013 | Ghosh et al. | |
| 8,570,006 B2 | 10/2013 | Moussaoui et al. | |
| 8,649,128 B2 | 2/2014 | Wang et al. | |
| 8,710,820 B2 | 4/2014 | Parker | |
| 8,736,240 B2 | 5/2014 | Liu et al. | |
| 8,764,247 B2 | 7/2014 | Pattekar et al. | |
| 8,810,214 B2 | 8/2014 | Van Dijk et al. | |
| 8,824,167 B2 | 9/2014 | Hughes et al. | |
| 8,829,868 B2 | 9/2014 | Waltman et al. | |
| 8,866,551 B2 | 10/2014 | Lam et al. | |
| 8,873,263 B2 | 10/2014 | Feng et al. | |
| 8,885,308 B2 | 11/2014 | Waltman et al. | |
| 8,890,630 B2 | 11/2014 | Hughes | |
| 9,030,178 B2 | 5/2015 | Chang et al. | |
| 9,041,378 B1 | 5/2015 | Lam et al. | |
| 9,106,142 B2 | 8/2015 | Huang et al. | |
| 2002/0015320 A1 | 2/2002 | Mochikawa et al. | |
| 2002/0071300 A1 | 6/2002 | Jang et al. | |
| 2004/0125523 A1 | 7/2004 | Edwards et al. | |
| 2004/0178776 A1 | 9/2004 | Hansen et al. | |
| 2006/0039172 A1 | 2/2006 | Soldano | |
| 2006/0132105 A1 | 6/2006 | Prasad et al. | |
| 2006/0212138 A1 | 9/2006 | Zhang | |
| 2006/0220629 A1 | 10/2006 | Saito et al. | |
| 2006/0227582 A1 | 10/2006 | Wei et al. | |
| 2007/0152644 A1 | 7/2007 | Vinn | |
| 2008/0031014 A1 | 2/2008 | Young | |
| 2008/0197724 A1 | 8/2008 | Cullen et al. | |
| 2009/0067206 A1 | 3/2009 | Oguchi et al. | |
| 2009/0128110 A1 | 5/2009 | DeLurio et al. | |
| 2009/0154204 A1 * | 6/2009 | Taylor | H02M 3/33592 363/52 |
| 2009/0167432 A1 | 7/2009 | van den Heuvel | |
| 2009/0174381 A1 | 7/2009 | Ojanen et al. | |
| 2009/0237057 A1 | 9/2009 | Dishman et al. | |
| 2009/0256547 A1 | 10/2009 | Akyildiz et al. | |
| 2009/0273431 A1 | 11/2009 | Hurst | |
| 2009/0302775 A1 | 12/2009 | Alexandrov | |
| 2009/0321045 A1 | 12/2009 | Hernon et al. | |
| 2009/0321046 A1 | 12/2009 | Hernon et al. | |
| 2010/0014330 A1 | 1/2010 | Chang et al. | |
| 2010/0117715 A1 | 5/2010 | Ariyama | |
| 2010/0176755 A1 | 7/2010 | Hoadley et al. | |
| 2010/0253309 A1 | 10/2010 | Xi et al. | |
| 2011/0103105 A1 | 5/2011 | Wei et al. | |
| 2011/0169471 A1 | 7/2011 | Nagasawa | |
| 2012/0268227 A1 | 10/2012 | Howes et al. | |
| 2013/0021108 A1 | 1/2013 | Hughes | |
| 2013/0049918 A1 | 2/2013 | Fu et al. | |
| 2013/0121043 A1 | 5/2013 | Pietkiewicz | |

(56) References Cited

U.S. PATENT DOCUMENTS

| | | | |
|---|---|---|---|
| 2013/0245854 A1 | 9/2013 | Rinne et al. | |
| 2013/0299148 A1 | 11/2013 | Hernon et al. | |
| 2014/0015629 A1 | 1/2014 | Zeng et al. | |
| 2014/0016356 A1 | 1/2014 | Furmanczyk et al. | |
| 2014/0118946 A1 | 5/2014 | Tong et al. | |
| 2014/0192561 A1 | 7/2014 | Plesnik | |
| 2014/0327417 A1 | 11/2014 | Zhu et al. | |
| 2015/0137412 A1 | 5/2015 | Schalansky | |

FOREIGN PATENT DOCUMENTS

| | | |
|---|---|---|
| CN | 103582997 A | 2/2014 |
| CN | 104704742 A | 6/2015 |
| JP | 2001-320250 A | 11/2001 |
| JP | 2002-076799 A | 3/2002 |
| JP | 2007-263944 A | 10/2007 |
| JP | 5030216 B2 | 9/2012 |
| KR | 2008-019196 A | 3/2008 |
| KR | 2008-101784 A | 11/2008 |
| WO | 2011/123680 A2 | 10/2011 |
| WO | 2012/100810 A1 | 8/2012 |
| WO | 2012/116263 A1 | 8/2012 |
| WO | 2014/039982 A1 | 3/2014 |
| WO | 2014/103298 A1 | 7/2014 |

OTHER PUBLICATIONS

"Application Guide: Theory of Operation," MicroPower Direct, URL=http://micropowerdirect.com/PDF%20Files/Application%20Notes/Power%20Supply%20Theory%20of%20Operation.pdf, download date Apr. 18, 2012, 6 pages.

"Buck converter," URL=http://en.wikipedia.org/wiki/Buck_converter, download date Jun. 23, 2011, 14 pages.

"Maximum Flexible Power (MFP) Single Output Point of Load: Technical Preview—3-6 VDC in, 7 Amp, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, URL=http://www.maxim-ic.com/appnotes/index.mvp/id/652, download date Jun. 22, 2011, 6 pages.

Barrett, "Microwave Printed Circuits—The Early Years," *IEEE Transactions on Microwave Theory and Techniques* MTT-32(9):983-990, Sep. 1984.

Bharj, "Evanescent Mode Waveguide to Microstrip Transition," *Microwave Journal—International Edition* 26, vol. 2, p. 147, Feb. 1983.

Chinese Office Action, issued May 22, 2015, for Chinese Application No. 201280016631.1, 15 pages. (with Partial English Translation).

Chiou et al., "Balun design for uniplanar broad band double balanced mixer," *Electronics Letters* 31(24):2113-2114, Nov. 23, 1995.

Coates, "Power supplies—3.0 Switched Mode Power Supplies," www.learnabout-electronics.org, 2007-2013, 20 pages.

Cohn, "Shielded Coupled-Strip Transmission Line," *IRE Transactions on Microwave Theory and Techniques* MTT-3(5):29-38, Oct. 1955.

Craven et al., "The Design of Evanescent Mode Waveguide Bandpass Filters for a Prescribed Insertion Loss Characteristic," *IEEE Transactions on Microwave Theory and Techniques* MTT-19(3):295-308, Mar. 1971.

Cristal et al., "Theory and Tables of Optimum Symmetrical TEM-Mode Coupled-Transmission-Line Directional Couplers," *IEEE Transactions on Microwave Theory and Techniques* MTT-13(5):544-558, Sep. 1965.

Cuon et al., "Dynamic Maneuvering Configuration of Multiple Control Modes in a Unified Servo System," Amendment filed Mar. 6, 2015, for U.S. Appl. No. 14/333,705, 11 pages.

De Lillo, "Multilayer Dielectric Evanescent Mode Waveguide Filter," U.S. Appl. No. 09/677,674, filed Oct. 2, 2000, 48 pages.

De Lillo, "Multilayer Dielectric Evanescent Mode Waveguide Filter Utilizing Via Holes," U.S. Appl. No. 09/604,502, filed Jun. 27, 2000, 57 pages.

eCircuit Center, "Op Amp Offset Adjustment," 2002, retrieved from http://www.ecircuitcenter.com/Circuits/op_voff/op_voff2.htm on Mar. 26, 2012, 3 pages.

European Search Report, dated May 21, 2003, for EP application No. 00939819.9, 2 pages.

Gokdemir et al., "Design and Performance of GaAs MMIC CPW Baluns Using Overlaid and Spiral Couplers," *1997 IEEE MTT-S Digest*, pp. 401-404, 1997.

Gunston, *Microwave Transmission-Line Impedance Data*, Van Nostrand Reinhold Company, London, 1972, pp. 23-24, 26, 61. (6 total pages).

Gunston, *Microwave Transmission-Line Impedance Data*, Van Nostrand Reinhold Company, London, 1972, pp. 63-81.

Hallford, "A Designer's Guide to Planar Mixer Baluns," *Microwaves*, 52-57, Dec. 1979, 4 pages.

Henderson, "Mixers: Part 2—Theory and Technology," *RF Microwave Designer's Handbook*, pp. 476-483, 1998.

Ho et al., "New analysis technique builds better baluns," *Microwaves & RF*, pp. 99-102, Aug. 1985.

Howe, Jr., "Microwave Integrated Circuits—An Historical Perspective," *IEEE Transactions on Microwave Theory and Techniques* MTT-32(9):991-996, Sep. 1984.

Hughes et al., "Self Synchronizing Power Converter Apparatus and Method Suitable for Auxiliary Bias for Dynamic Load Applications," Notice of Allowance mailed May 14, 2014, for U.S. Appl. No. 13/185,217, 10 pages.

Hughes, "Oscillator Apparatus and Method With Wide Adjustable Frequency Range," Office Action mailed Jun. 5, 2013, for U.S. Appl. No. 13/185,152, 17 pages.

Hughes, "Oscillator Apparatus and Method With Wide Adjustable Frequency Range," Amendment filed Oct. 7, 2013, for U.S. Appl. No. 13/185,152, 15 pages.

Hughes, "Oscillator Apparatus and Method With Wide Adjustable Frequency Range," Office Action mailed Jan. 28, 2014, for U.S. Appl. No. 13/185,152, 15 pages.

Hughes, "Oscillator Apparatus and Method With Wide Adjustable Frequency Range," Amendment filed Apr. 24, 2014, for U.S. Appl. No. 13/185,152, 8 pages.

Hughes, "Oscillator Apparatus and Method With Wide Adjustable Frequency Range," Notice of Allowance mailed Jul. 14, 2014, for U.S. Appl. No. 13/185,152, 12 pages.

Hume et al., "Power Converter Apparatus and Method With Compensation for Light Load Conditions," Office Action mailed Nov. 6, 2013, for U.S. Appl. No. 13/185,142, 11 pages.

International Search Report, dated Aug. 12, 2002, for PCT/US01/50033, 1 page.

International Search Report, mailed Aug. 31, 2015 for International Patent Application No. PCT/US2015/033321, 9 pages.

International Search Report, mailed Dec. 20, 2013, for PCT/US2013/058784, 3 pages.

International Search Report, mailed Oct. 14, 2011, for PCT/US2011/030778, 3 pages.

Jansen et al., "Improved compaction of multilayer MMIC/MCM baluns using lumped element compensation," *1997 IEEE MTT-S Digest*, pp. 277-280, 1997.

Konishi, "Novel Dielectric Waveguide Components—Microwave Applications of New Ceramic Materials," *Proceedings of the IEEE* 79(6):726-740, Jun. 1991.

Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.

Kumar et al., "An Improved Planar Balun Design for Wireless Microwave and RF Applications," *1997 IEEE*, pp. 257-260, Apr. 1997.

(56) References Cited

OTHER PUBLICATIONS

Lam et al., "Dynamic Maneuvering Configuration for Multiple Control Modes in a Unified Servo System," Office Action mailed Dec. 23, 2014, for U.S. Appl. No. 14/333,705, 6 pages.

Lam et al., "Dynamic Maneuvering Configuration for Multiple Control Modes in a Unified Servo System," U.S. Appl. No. 14/333,705, filed Jul. 17, 2014, 36 pages.

Lam et al., "Impedance Compensation for Operational Amplifiers Used in Variable Environments," Office Action mailed Feb. 7, 2014, for U.S. Appl. No. 13/609,107, 11 pages.

Lam et al., "Impedance Compensation for Operational Amplifiers Used in Variable Environments," Amendment filed May 6, 2014, for U.S. Appl. No. 13/609,107, 12 pages.

Lauriello, "Process for Manufacturing Fusion Bonded Assembly With Attached Leads," U.S. Appl. No. 11/901,749, filed Sep. 19, 2007, 14 pages.

Ledain et al., "Innovative Multilayer Technologies for Active Phased Array Antennas," Dassault Electronique, Saint-Cloud, France, 1997, 7 pages.

Levy, "General Synthesis of Asymmetric Multi-Element Coupled-Transmission-Line Directional Couplers," *IEEE Transactions on Microwave Theory and Techniques* MTT-11(4):226-237, Jul. 1963.

Levy, "Tables for Asymmetric Multi-Element Coupled-Transmission-Line Directional Couplers," *IEEE Transactions on Microwave Theory and Techniques* MTT-12(3):275-279, May 1964.

Light et al., "High Frequency, Fluoropolymer-Based Packaging Technology," IBM Microelectronics, Endicott, NY, Oct. 1994, 16 pages.

Maas, "The Diode-Ring Mixer," *RF Design Magazine*, pp. 54-62, Nov. 1993, 5 pages.

Manfredi et al., "Additive Manufacturing of Al Alloys and Aluminum Matrix Composites (AMCs)," in Monteiro (ed.), *Light Metal Alloys Applications*, InTech, Jun. 11, 2014, 32 pages.

Marchand, "Transmission-Line Conversion," *Electronics* 17(12):142-145, Dec. 1944.

Merriam-Webster, "Directly," retrieved from http://www.merriam-webster.com/dictionary/directly, on Nov. 6, 2012, 1 page.

Mitsuya, "Basics of Noise Countermeasures—Lesson 14: Using Common Mode Choke Coils for Power Supply Lines," Murata Manufacturing Co., Ltd., Oct. 28, 2014, retrieved on Feb. 4, 2015, from http://www.murata.com/en-eu/products/emiconfun/emc/2014/10/28/en-20141028-p1, 3 pages.

Ng, "Implementing Constant Current Constant Voltage AC Adapter by NCP1200 and NCP4300A," ON Semiconductor, Application Note, Publication Order No. AND8042/D, Feb. 2001, 12 pages.

Nguyen et al., "Nulling Input Offset Voltage of Operational Amplifiers," Mixed Signal Products, Texas Instruments—Application Report SLOA045, Aug. 2000, pp. 1-15.

Oltman, "The Compensated Balun," *IEEE Transactions on Microwave Theory and Techniques* MTT-14(3):112-119, Mar. 1966.

Palamutcuoglu et al., "Broadband Microwave Mixer Mounted on Suspended Line Baluns," *1994 IEEE*, pp. 500-503, 1994.

Parker et al., "Integrated Tri-State Electromagnetic Interference Filter and Line Conditioning Module," U.S. Appl. No. 14/632,818, filed Feb. 26, 2015, 31 pages.

Parker et al., "Integrated Tri-State Electromagnetic Interference Filter and Line Conditioning Module," Office Action mailed Apr. 24, 2015, for U.S. Appl. No. 14/632,818, 11 pages.

Parker et al., "Transformer-Based Power Converters With 3D Printed Microchannel Heat Sink," U.S. Appl. No. 14/627,556, filed Feb. 20, 2015, 44 pages.

Parker et al., "Transformer-Based Power Converters With 3D Printed Microchannel Heat Sink," Office Action mailed Apr. 16, 2015, for U.S. Appl. No. 14/627,556, 9 pages.

Parker et al., "Transformer-Based Power Converters With 3D Printed Microchannel Heat Sink," Office Action, dated Aug. 3, 2015, for U.S. Appl. No. 14/627,556, 11 pages.

Parker, "Switched Capacitor Hold-Up Scheme for Constant Boost Output Voltage," Office Action mailed Mar. 28, 2012, for U.S. Appl. No. 12/751,067, 16 pages.

Parker, "Switched Capacitor Hold-Up Scheme for Constant Boost Output Voltage," Amendment filed Jul. 30, 2012, for U.S. Appl. No. 12/751,067, 18 pages.

Parker, "Switched Capacitor Hold-Up Scheme for Constant Boost Output Voltage," Office Action mailed Nov. 16, 2012, for U.S. Appl. No. 12/751,067, 20 pages.

Parker, "Switched Capacitor Hold-Up Scheme for Constant Boost Output Voltage," Office Action mailed Jul. 30, 2013, for U.S. Appl. No. 12/751,067, 18 pages.

Parker, "Switched Capacitor Hold-Up Scheme for Constant Boost Output Voltage," Amendment filed Oct. 30, 2013, for U.S. Appl. No. 12/751,067, 19 pages.

Parker, "Switched Capacitor Hold-Up Scheme for Constant Boost Output Voltage," Notice of Allowance mailed Feb. 3, 2014, for U.S. Appl. No. 12/751,067, 11 pages.

Pascu, "Error Amplifier with Forced Equilibrium Adaptor," Kepco, Inc., retrieved from http://www.kepcopower.com/equibm2.htm#fig2, dated May 22, 2014, 8 pages.

Rizzi, *Microwave Engineering: Passive Circuits*, Prentice Hall, Englewood Cliffs, New Jersey, pp. 200-219, 1988, 21 pages.

Shrisavar, "Introduction to Power Management," Texas Instruments, Biracha Digital Power Ltd., 2014, 37 pages.

Snyder, "New Application of Evanescent Mode Waveguide to Filter Design," *IEEE Transactions on Microwave Theory and Techniques* MTT-25(12):1013-1021, Dec. 1977.

Sturdivant, "Balun Designs for Wireless, . . . Mixers, Amplifiers and Antennas," *Applied Microwave*, pp. 34-44, Summer 1993, 6 pages.

Toyoda et al., "Three-Dimensional MMIC and Its Application: An Ultra-Wideband Miniature Balun," *IEICE Trans. Electron.* E78-C(8):919-924, Aug. 1995.

Tresselt, "Design and Computed Theoretical Performance of Three Classes of Equal-Ripple Nonuniform Line Couplers," *IEEE Transactions on Microwave Theory and Techniques* MTT-17(4):218-230, Apr. 1969.

Tutt et al., "A Low Loss, 5.5 GHz-20 GHz Monolithic Balun," *1997 IEEE MTT-S Digest*, pp. 933-936, 1997.

Waltman et al., "Input Control Apparatus and Method With Inrush Current, Under and Over Voltage Handling," Office Action mailed Jun. 17, 2014, for U.S. Appl. No. 13/185,210, 8 pages.

Waltman et al., "Power Converter Apparatus and Method With Compensation for Current Limit/Current Share Operation," Office Action mailed Dec. 17, 2013, for U.S. Appl. No. 13/185,172, 15 pages.

Waltman et al., "Power Converter Apparatus and Method With Compensation for Current Limit/Current Share Operation," Amendment filed Mar. 17, 2014, for U.S. Appl. No. 13/185,172, 16 pages.

Waltman et al., "Power Converter Apparatus and Method With Compensation for Current Limit/Current Share Operation," Notice of Allowance mailed May 8, 2014, for U.S. Appl. No. 13/185,172, 10 pages.

Waltman et al., "Power Converter Apparatus and Methods," U.S. Appl. No. 61/508,937, filed Jul. 18, 2011, 139 pages.

Willems et al., "Evanescent-Mode Waveguide Filters Built in a Day," *Microwaves & RF* 26(7):117-124, Jul. 1987, 5 pages.

Written Opinion, mailed Dec. 20, 2013, for PCT/US2013/058784, 4 pages.

Written Opinion, mailed Oct. 14, 2011, for PCT/US2011/030778, 5 pages.

Xing et al., "Power System Architecture with Back-Up Power for Servers," ERC Program of the National Science Foundation, 5 pages.

Beta Dyne, "Synchronous Rectification," Application Note DC-006, DC/DC Converters, 2002, 3 pages.

Bottrill, "The Effects of Turning off a Converter with Self-Driven Synchronous Rectifiers," Power Guru, May 1, 2007, retrieved from http://www.powerguru.org/the-effects-of-turning-off-a-converter-with-self-driven-synchronous-rectifiers/ Jul. 10, 2015, 6 pages.

Jovanović et al., "Design Considerations for Forward Converter with Synchronous Rectifiers," Power Conversion Proceedings, pp. 340-350, Oct. 1993.

King et al., "Active Clamp Control Boosts Forward Converter Efficiency," *Power Electronics Technology*, pp. 52-55, Jun. 2003.

Mappus, "Synchronous Rectification for Forward Converters," Fairchild Semiconductor Power Seminar 2010-2011, 19 pages.

(56) References Cited

OTHER PUBLICATIONS

Michael T. Zhang, *Synchronous Rectification, Paralleling, Interleaving, Thermal*, Chapter Two, "Synchronous Rectification," pp. 9-72, PDF created Feb. 20, 1997.

Peter, "Synchronous rectifier in DC/DC converters," Oct. 5, 2009, retrieved from http://www.posterus.sk/?p=2535, on Jul. 10, 2015, 11 pages.

Plesnik, "A New Method for Driving Synchronous Rectifiers," IEICE/IEEE INTELEC'03, Oct. 19-23, Yokohama, Japan, pp. 274-281, 2003.

Furmanczyk et al., "AC/DC Power Conversion System and Method of Manufacture of Same," Office Action, for U.S. Appl. No. 14/001,312, mailed Dec. 8, 2015, 13 pages.

* cited by examiner

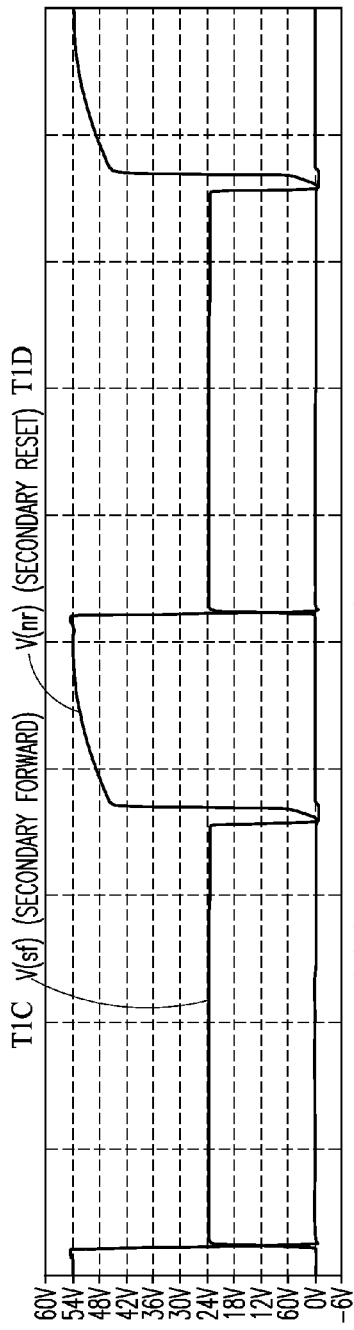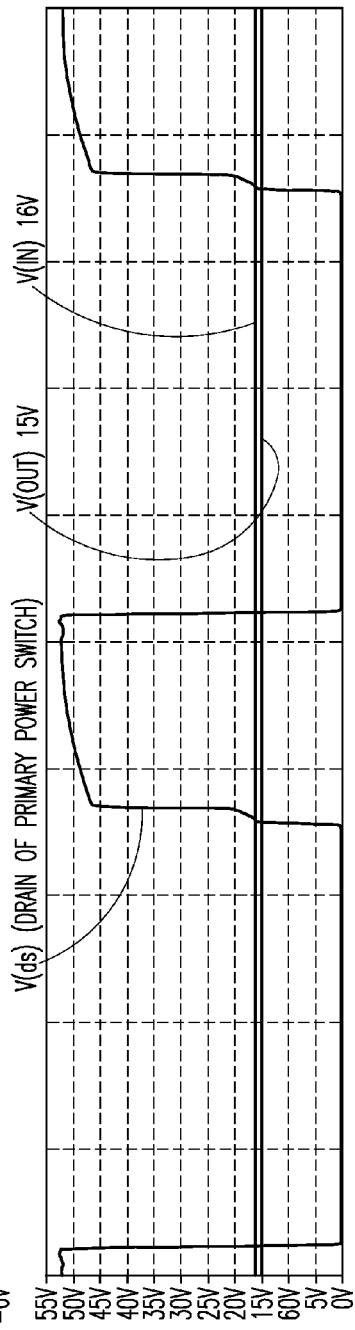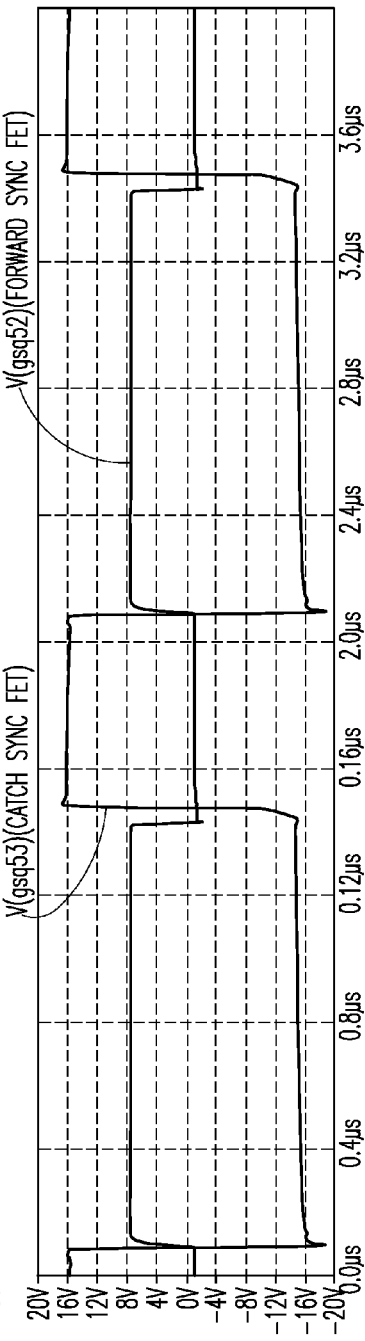

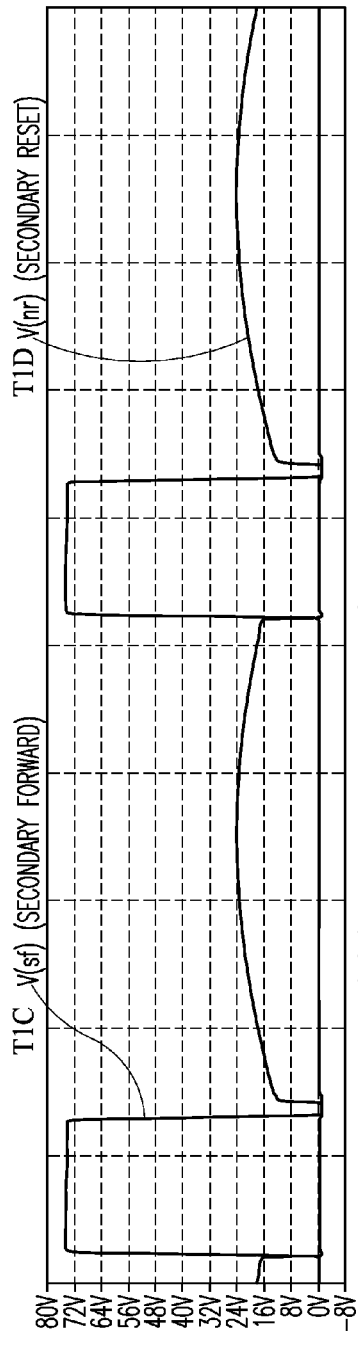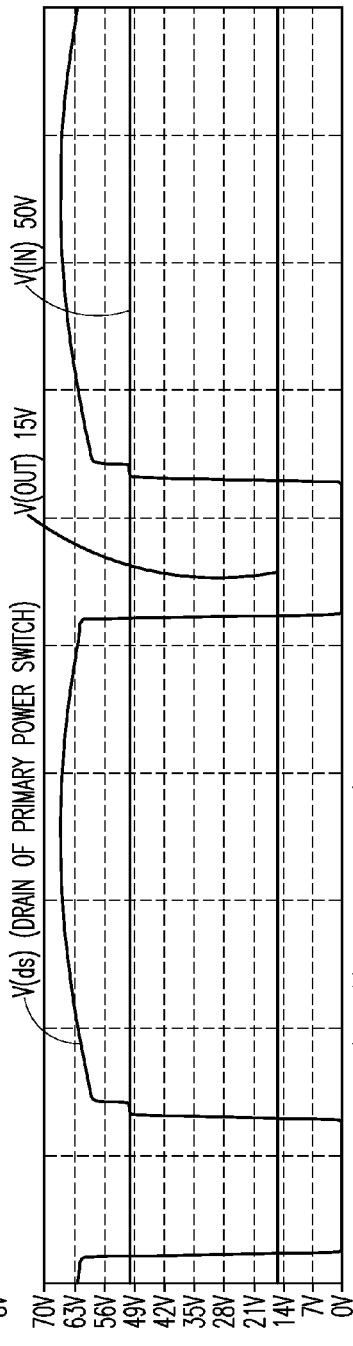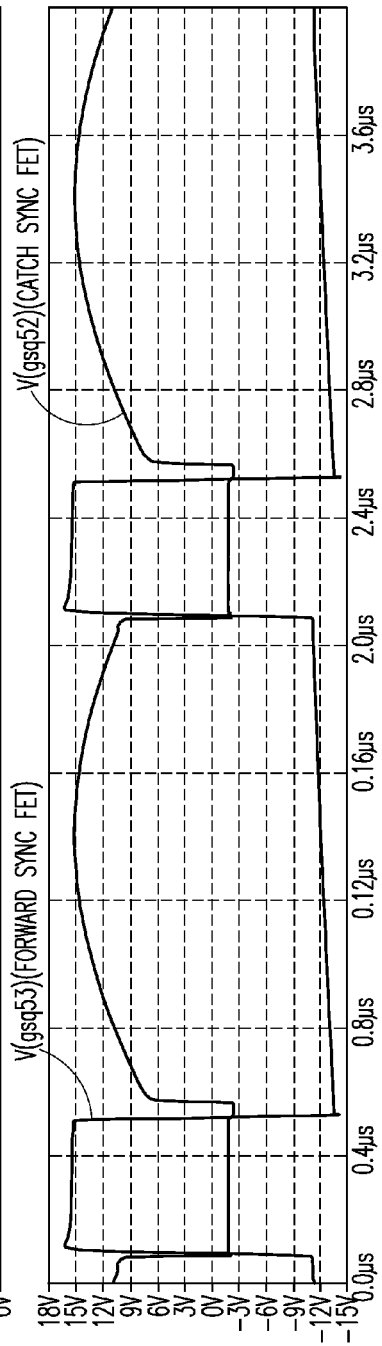

AUTOMATIC ENHANCED SELF-DRIVEN SYNCHRONOUS RECTIFICATION FOR POWER CONVERTERS

BACKGROUND

1. Technical Field

The present disclosure generally relates to power converters.

2. Description of the Related Art

DC/DC converters are a type of power supply which converts an input DC voltage to a different output DC voltage. Such converters typically include a transformer that is electrically coupled via a switching circuit between a voltage source and a load. Converters known as forward converters include a main switch connected between the voltage source and the primary winding of the transformer to provide forward power transfer to the secondary winding of the transformer when the switch is on and conducting. A metal oxide semiconductor field effect transistor (MOSFET) device is typically used for the switch.

Power converter designs are often constrained by various requirements, such as efficiency, input voltage range, output voltage, power density, and footprint area. These constraints require certain performance tradeoffs. For instance, achieving higher efficiencies may require a more narrow input voltage range. To further improve efficiencies, active-reset schemes and synchronous rectifications are often employed. These synchronous rectification schemes can either be active-control or self-driven.

A limitation of forward converters is that it may be necessary to reset the transformer core to prevent saturation (i.e., discharge the magnetizing current of the transformer during the off period of the main switch). This limitation results from the unipolar character of the transformer core excitation. Techniques exist for resetting the transformer of a forward converter. One such technique is to include a resistor-capacitor-diode (RCD) network in parallel with the primary winding. The RCD network clamps the voltage on the switch to the minimal peak voltage consistent with a given source voltage and switch duty cycle, thereby eliminating the need for dead time while allowing for a wide range of duty cycles. This tends to reduce the voltage stress applied to the switch. Nevertheless, this transformer resetting technique reduces the efficiency of the converter due to the dissipation of the magnetizing energy accumulated in the transformer during the on period of the switch. Instead of being recycled, this magnetizing energy is partially converted into heat by the RCD network.

Another method of transformer resetting is to use a series connection of a capacitor and an auxiliary switch connected across the transformer winding either on the primary side or on the secondary side (referred to as an "active clamp" or "active reset"). When the main switch is turned off, the auxiliary switch is turned on, and vice versa. Thus, magnetizing energy in the transformer is transferred to the clamping capacitor, and the clamping capacitor resonates with the magnetizing inductance to maintain the necessary level of reset voltage. This active clamp reset provides non-dissipative reset of the transformer and minimal voltage stress on the main switch under steady state conditions as dead time is almost zero. For this reason, the active clamp method is compatible with self-driven synchronous rectification.

In switching power supply circuits employing synchronous rectifiers, the diodes are replaced by power transistors to obtain a lower on-state voltage drop. The synchronous rectifier generally uses n-channel MOSFETs rather than diodes to avoid the turn-on voltage drop of diodes which can be significant for low output voltage power supplies. The transistors are biased to conduct when a diode would have been conducting from anode to cathode, and conversely, are gated to block current when a diode would have been blocking from cathode to anode. Although MOSFETs usually serve this purpose, bipolar transistors and other active semiconductor switches may also be suitable.

In these synchronous rectifier circuits, the gate signals can be self-driven, i.e., the gate signal can be tied to the power circuit, or controlled-driven, i.e., the gate signal is derived from some point in the circuit and goes through some active processing circuit before being fed to the MOSFET gate driver. In a power converter, the synchronous rectifier which conducts during the non-conducting period of the main power switch (switches) may be referred to as a freewheeling or "catch" synchronous rectifier. The synchronous rectifier which conducts during the conducting period of the main power switch (switches) may be referred to as a forward synchronous rectifier.

FIG. 1 shows conventional synchronous rectifiers in a forward converter 10. In this example, a DC voltage input Vin is connected to a primary winding 12 of a transformer T by a MOSFET power switch Q1. A clamp circuit arrangement is also provided to limit the reset voltage. In particular, the MOSFET power switch Q1 is shunted by a series connection of a clamp capacitor Creset and a MOSFET switch device Q2. The conducting intervals of Q1 and Q2 are mutually exclusive. The voltage inertia of the capacitor Creset limits the amplitude of the reset voltage appearing across the magnetizing inductance during the non-conducting interval of the MOSFET power switch Q1.

A secondary winding 14 of the transformer T is connected to an output lead Vo through a synchronous rectifier including MOSFET rectifying devices SR1 and SR2. Each rectifying device SR1 and SR2 includes a body diode. With the power switch Q1 conducting, the input voltage Vin is applied across the primary winding 12. The secondary winding 14 is oriented in polarity to respond to the primary voltage with a current flow through an inductor Lo, through the load $R_L$ connected to the output lead, and back through the MOSFET rectifier device SR1 to the secondary winding 14. Continuity of the current flow in the inductor Lo when the power switch Q1 is non-conducting is maintained by the current path provided by the conduction of the MOSFET rectifier device SR2. An output filter capacitor Co shunts the output of the converter 10.

Conductivity of the two rectifier devices SR1 and SR2 is controlled by SR gate drive logic 16 which may receive signals by a primary active-reset pulse-width modulated (PWM) controller 18 via isolated feedback and synchronization logic 20. The active-reset PWM controller 18 may include, for example, one or more oscillators, comparators, and/or flip-flops. The output of the PWM controller 18 provides a PWM drive signal to the main switch Q1 and the auxiliary switch Q2.

The active-control methods like the one shown in FIG. 1 often require more complex circuit design and greater part counts, which may increase cost and product size. In particular, active-control typically requires secondary synchronization with the primary controller. Such synchronization may require an isolated feedback, which may require many more components and an increase in footprint. For hybrid converters, minimizing part count and footprint may be critical to achieve high power density.

With the self-driven methods, the driving signal is generated using discrete components and/or extra transformer windings which produce the necessary signals for driving the synchronous rectifying devices.

For example, FIG. 2 shows a schematic diagram for an active-clamp forward power converter 30 which includes self-driven synchronous rectification. In this example, the MOSFET rectifier device SR1 is coupled to one node 32 of the secondary winding 14 of the transformer T via a gate resistor 34, and the MOSFET rectifier device SR2 is coupled to another node 36 of the secondary winding of the transformer T via a gate resistor 38.

Self-driven rectification schemes such as that shown in FIG. 2 are frequently used to decrease design complexity, but they have several limitations. In particular, the input voltage range is relatively narrow for a given output voltage. For example, a design that requires an input voltage range ratio which is greater than 3.13 may be challenging, especially for a design which can scale the output voltages from 3.3 V to 15 V without extra transformer windings. In fact, to scale the output to 15 V, the self-driven scheme may require a tertiary winding 52, as shown in the active-clamp forward converter 50 of FIG. 3. This limitation becomes more problematic as the input voltage range ratio increases beyond 3:1.

These conventional self-driven methods have several drawbacks, but such drawbacks are not limited to the gate drive voltages. For a given output voltage and input voltage range, the transformer ratio should be calculated properly so that the catch synchronous FET has sufficient gate voltage to fully enhance at the highest line but not to exceed the maximum gate voltage rating at the lowest line, and it should be ensured that the forward synchronous FET has sufficient gate voltage to fully enhance at the lowest line but not to exceed the maximum gate voltage at the highest line.

These two contradictory requirements between the forward and catch synchronous FETs make it difficult to achieve a wide input. As such, the input voltage range is usually compromised and has be made more narrow until the desired output voltage is feasible with the required transformer turns ratio. A potential mitigation to provide sufficient gate voltage for full enhancement of the FETs while not exceeding the maximum gate-source voltage (Vgs) rating would be to clamp the gate voltages when Vgs is at its highest value. Zener diodes are typically used for this purpose but the power losses in them are not desirable since the primary purpose of synchronous rectification is to minimize losses in the secondary switches.

FIG. 4 shows schematic for an active-clamp forward converter 100 which uses a technique for self-driven synchronous rectification that includes summing the forward and reset voltage on the primary winding. Primary input voltage is provided at 101 to one side of a primary winding 103 of a transformer 102. Coupled to the other side of the primary winding 103 are a capacitor 107 and a main switch 109. An auxiliary switch 108 is connected to the other side of the capacitor 107 and to the other primary input voltage leads 111. The main switch 109 also connects to the other primary input voltage lead 111. Gate drive for switches 108 and 109 is provided at 110 and 112, respectively, and consists of appropriate out-of-phase drive signals which alternately turn on and off the switches 108 and 109 to produce an alternating current in the primary winding 103 of the transformer 102.

A secondary winding 104 of the transformer 102 has two synchronous rectifiers, a switch 114 and a switch 115, which are driven by circuitry described below so as to conduct at appropriate times to rectify the voltage waveform produced across the secondary winding 104. An output inductor 113 and an output capacitor 116 act to smooth voltage and current variations in the output current and voltage respectively. A resistor 118 and a capacitor 117 are illustrative of loads on the power supply, while a secondary side ground reference point 119a is coupled to the loads.

Tertiary windings 105 and 106 of the transformer 102 produce the driving voltages for the synchronous rectifying switches 114 and 115. Voltage pulses produced at the windings 105 and 106 due to the variations in current in the primary winding 103 are passed through capacitors 120 and 123, respectively, to the gates of the switches 114 and 115, respectively. Diodes 121 and 124 provide a current path during the reverse voltage cycles of the windings 105 and 106, while the resistors 122 and 125 ensure that the gates of the switches 114 and 115 will be turned off when no driving voltage is present. A secondary side ground reference point 119b may be conductively continuous with the ground reference point 119a.

For active clamp forward converters like the converter shown in FIG. 4, a common technique for self-driven synchronous rectification is by summing the forward and reset voltage on the primary winding. The idea is to provide a relatively constant voltage over line variation, which is desirable. However, the method requires a few trade-offs that may offset that advantage. In particular, the summation requires at least two additional timing circuitries on the secondary side, one for each of the synchronous switches 114 and 115, in addition to the one timing setting required on the primary side. Unfortunately, the timing circuitries on the secondary side are dependent on the line and load variation, so that no single optimal timing values can be set to cover the entire input voltage and output load ranges. Errors in the timings will potentially cause shoot through current and consequently may limit the operating frequency to at most 300 kHz. These methods convert a bipolar signal into a unipolar signal. A potential drawback of this is a shoot through current for a sudden stop in which both synchronous FETs are turned on at the same time continuously for ten or more cycles, essentially creating a short circuit across the output.

BRIEF SUMMARY

An automatic enhanced self-driven synchronous rectification (AESDSR) control circuit for an active-clamp forward converter, the active clamp forward converter including a transformer having a primary winding and a secondary winding, a primary circuit electrically coupled to the primary winding, a secondary circuit electrically coupled to the secondary winding, the secondary circuit comprising first and second synchronous rectifying elements electrically connected in series with each other and electrically connected in parallel to the secondary winding, the first and second synchronous rectifying elements being electrically coupled together at a common node, the first and second synchronous rectifying elements comprising respective first and second control nodes, the AESDSR control circuit may be summarized as including: a first passive synchronous rectifier (SR) control circuit comprising: a first direct current (DC) voltage divider circuit electrically coupled between a first node of the secondary winding and the common node, the first DC voltage divider circuit having an output electrically connected to the first control node of the first synchronous rectifying element; a first alternating current (AC) voltage divider circuit electrically coupled between the first node of the secondary winding and the common node, the first AC voltage divider circuit having an output electrically connected to the first control node of the first synchronous rectifying element; and a first control node voltage limiter circuit electrically coupled between the first control node of the first synchronous rectifying element and the common node; and a second passive SR control circuit comprising: a second DC voltage divider circuit electrically coupled between a second node of the secondary winding and the common node, the second DC voltage divider circuit having an output electrically connected to the second control node of the second synchronous rectifying element; a second AC voltage divider circuit electrically coupled between the second node of the secondary winding and the common node, the second AC voltage divider circuit having an output electrically connected to the second control node of the second synchronous rectifying element; and a second control node voltage limiter circuit electrically coupled between the second control node of the second synchronous rectifying element and the common node.

The first passive SR control circuit may include a first peak current limiter circuit electrically coupled between the common node and the first node of the secondary winding, and the second passive SR control circuit may include a second peak current limiter circuit electrically coupled between the common node and the second node of the secondary winding. The first peak current limiter circuit may include a first resistor coupled in parallel with a first diode, and the second peak current limiter circuit may include a second resistor coupled in parallel with a second diode. Each of the first DC voltage divider circuit and the second DC voltage divider circuit may include at least two resistors. The first AC voltage divider circuit may include a capacitor and an internal capacitance of the first synchronous rectifying element, and the second AC voltage divider circuit may include a capacitor and an internal capacitance of the second synchronous rectifying element. The first control node voltage limiter circuit may include a first zener diode and a second zener diode electrically connected anode-to-anode with each other, and the second control node voltage limiter circuit may include a third zener diode and a fourth zener diode electrically connected anode-to-anode with each other. The first control node voltage limiter circuit may include: a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and the second control node voltage limiter circuit may include: a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

An automatic enhanced self-driven synchronous rectification (AESDSR) control circuit for an active-clamp forward converter, the active clamp forward converter comprising a transformer having a primary winding and a secondary winding, a primary circuit electrically coupled to the primary winding, a secondary circuit electrically coupled to the secondary winding, the secondary circuit comprising first and second synchronous rectifying elements electrically connected in series with each other and electrically connected in parallel to the secondary winding, the first and second synchronous rectifying elements being electrically coupled together at a common node, the first and second synchronous rectifying elements comprising respective first and second control nodes, the AESDSR circuit may be summarized as including: a first passive synchronous rectifier (SR) control circuit comprising: a first direct current (DC) voltage divider circuit electrically coupled between a first node of the secondary winding and the common node, the first DC voltage divider circuit having an output electrically connected to the first control node of the first synchronous rectifying element, the first DC voltage divider comprising at least two resistors; a first alternating current (AC) voltage divider circuit electrically coupled between the first node of the secondary winding and the common node, the first AC voltage divider circuit having an output electrically connected to the first control node of the first synchronous rectifying element, the first AC voltage divider circuit comprises a capacitor and an internal capacitance of the first synchronous rectifying element; and a first control node voltage limiter circuit electrically coupled between the first control node of the first synchronous rectifying element and the common node, the first control node voltage limiter circuit comprises a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and a second passive synchronous rectifier (SR) control circuit comprising: a second direct current (DC) voltage divider circuit electrically coupled between a second node of the secondary winding and the common node, the second DC voltage divider circuit having an output electrically connected to the second control node of the second synchronous rectifying element, the second DC voltage divider comprising at least two resistors; a second alternating current (AC) voltage divider circuit electrically coupled between the second node of the secondary winding and the common node, the second AC voltage divider circuit having an output electrically connected to the second control node of the second synchronous rectifying element, the second AC voltage divider circuit comprises a capacitor and an internal capacitance of the second synchronous rectifying element; and a second control node voltage limiter circuit electrically coupled between the second control node of the second synchronous rectifying element and the common node, the second control node voltage limiter circuit comprises a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

The first passive SR control circuit may include a first peak current limiter circuit electrically coupled between the common node and the first node of the secondary winding, and the second passive SR control circuit may include a second peak current limiter circuit electrically coupled between the common node and the second node of the secondary winding. The first peak current limiter circuit may include a first resistor coupled in parallel with a first diode, and the second peak current limiter circuit may include a second resistor coupled in parallel with a second diode.

An active-clamp forward converter may be summarized as including: a transformer having a primary winding and a secondary winding; a primary circuit electrically coupled to the primary winding; a secondary circuit electrically coupled to the secondary winding, the secondary circuit comprising first and second synchronous rectifying elements electrically connected in series with each other and electrically connected in parallel to the secondary winding, the first and second synchronous rectifying elements being electrically coupled together at a common node, the first and second synchronous rectifying elements comprising respective first and second control nodes; and an automatic enhanced self-driven synchronous rectification (AESDSR) control circuit comprising:

a first passive synchronous rectifier (SR) control circuit comprising: a first direct current (DC) voltage divider circuit electrically coupled between a first node of the secondary winding and the common node, the first DC voltage divider circuit having an output electrically connected to the first control node of the first synchronous rectifying element; a first alternating current (AC) voltage divider circuit electrically coupled between the first node of the secondary winding and the common node, the first AC voltage divider circuit having an output electrically connected to the first control node of the first synchronous rectifying element; and a first control node voltage limiter circuit electrically coupled between the first control node of the first synchronous rectifying element and the common node; and a second passive SR control circuit comprising: a second DC voltage divider circuit electrically coupled between a second node of the secondary winding and the common node, the second DC voltage divider circuit having an output electrically connected to the second control node of the second synchronous rectifying element; a second AC voltage divider circuit electrically coupled between the second node of the secondary winding and the common node, the second AC voltage divider circuit having an output electrically connected to the second control node of the second synchronous rectifying element; and a second control node voltage limiter circuit electrically coupled between the second control node of the second synchronous rectifying element and the common node.

Each of the first and second synchronous rectifying elements may include a metal oxide semiconductor field effect transistor. The first passive SR control circuit may include a first peak current limiter circuit electrically coupled between the common node and the first node of the secondary winding, and the second passive SR control circuit may include a second peak current limiter circuit electrically coupled between the common node and the second node of the secondary winding. The first peak current limiter circuit may include a first resistor coupled in parallel with a first diode, and the second peak current limiter circuit may include a second resistor coupled in parallel with a second diode. Each of the first DC voltage divider circuit and the second DC voltage divider circuit may include at least two resistors. The first AC voltage divider circuit may include a capacitor and an internal capacitance of the first synchronous rectifying element, and the second AC voltage divider circuit may include a capacitor and an internal capacitance of the second synchronous rectifying element. The first control node voltage limiter circuit may include a first zener diode and a second zener diode electrically connected anode-to-anode with each other, and the second control node voltage limiter circuit may include a third zener diode and a fourth zener diode electrically connected anode-to-anode with each other. The first control node voltage limiter circuit may include: a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and the second control node voltage limiter circuit may include: a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

An active-clamped power converter may be summarized as including: a pair of input terminals supplied with input direct current (DC) voltage; a pair of output terminals which outputs DC voltage; a transformer having a primary winding and a secondary winding; a primary circuit electrically coupled to the input terminals and the primary winding of the transformer; a secondary circuit electrically coupled to the output terminals and the secondary winding of the transformer; a control circuit operatively coupled to at least one of the output terminals to control the primary circuit to produce a main switch control signal and a subsidiary switch control signal; the primary circuit comprising: a main switch electrically coupled in series with the primary winding of the transformer to form a primary series connection circuit and operable responsive to the main switch control signal to be selectively put into an on-state and an off-state, the primary series connection circuit being electrically coupled between the input terminals; and a first series circuit, connected in parallel with the primary winding of the transformer, comprising a clamping capacitor and a subsidiary switch which is operable responsive to the subsidiary control signal to be selectively put into an on-state and an off-state, the subsidiary switch carrying out reverse operation with the main switch to clamp a primary reset voltage appearing at the primary winding of the transformer; the secondary circuit comprising: a synchronous rectifier connected in parallel to the secondary winding of the transformer, the synchronous rectifier comprising: a second series circuit, electrically coupled in parallel to the secondary winding of the transformer, the second series circuit comprising first and second synchronous rectifying elements which are operable in synchrony with the main switch, the first and the second synchronous rectifying elements having first and second control nodes, respectively, the first and the second synchronous rectifying elements being joined together at a common node; a first passive synchronous rectifier (SR) control circuit comprising: a first direct current (DC) voltage divider circuit electrically coupled between a first node of the secondary winding and the common node, the first DC voltage divider circuit having an output electrically connected to the first control node of the first synchronous rectifying element; a first alternating current (AC) voltage divider circuit electrically coupled between the first node of the secondary winding and the common node, the first AC voltage divider circuit having an output electrically connected to the first control node of the first synchronous rectifying element; and a first control node voltage limiter circuit electrically coupled between the first control node of the first synchronous rectifying element and the common node; and a second passive SR control circuit comprising: a second DC voltage divider circuit electrically coupled between a second node of the secondary winding and the common node, the second DC voltage divider circuit having an output electrically connected to the second control node of the second synchronous rectifying element; a second AC voltage divider circuit electrically coupled between the second node of the secondary winding and the common node, the second AC voltage divider circuit having an output electrically connected to the second control node of the second synchronous rectifying element; and a second control node voltage limiter circuit electrically coupled between the second control node of the second synchronous rectifying element and the common node.

The first passive SR control circuit may include a first peak current limiter circuit electrically coupled between the common node and the first node of the secondary winding, and the second passive SR control circuit may include a second peak current limiter circuit electrically coupled between the common node and the second node of the secondary winding. The first peak current limiter circuit may include a first resistor coupled in parallel with a first diode, and the second peak current limiter circuit may include a second resistor coupled in parallel with a second diode. Each of the first DC voltage divider circuit and the second DC voltage divider circuit may include at least two resistors. The first AC voltage divider circuit may include a capacitor and an internal capacitance of the first synchronous rectifying element, and the second AC voltage divider circuit may include a capacitor and an internal capacitance of the second synchronous rectifying element. The first control node voltage limiter circuit may include a first zener diode and a second zener diode electrically connected anode-to-anode with each other, and the second control node voltage limiter circuit may include a third zener diode and a fourth zener diode electrically connected anode-to-anode with each other. The first control node voltage limiter circuit may include: a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and the second control node voltage limiter circuit may include: a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIGS. 6A-6C depict various waveforms for an active-clamp forward converter with self-driven synchronous rectification having an output voltage of 15 V and an input voltage of 16 V, according to one illustrated implementation.

FIGS. 7A-7C depict various waveforms for an active-clamp forward converter with self-driven synchronous rectification having an output voltage of 15 V and an input voltage of 50 V, according to one illustrated implementation.

DETAILED DESCRIPTION

Figure 1:
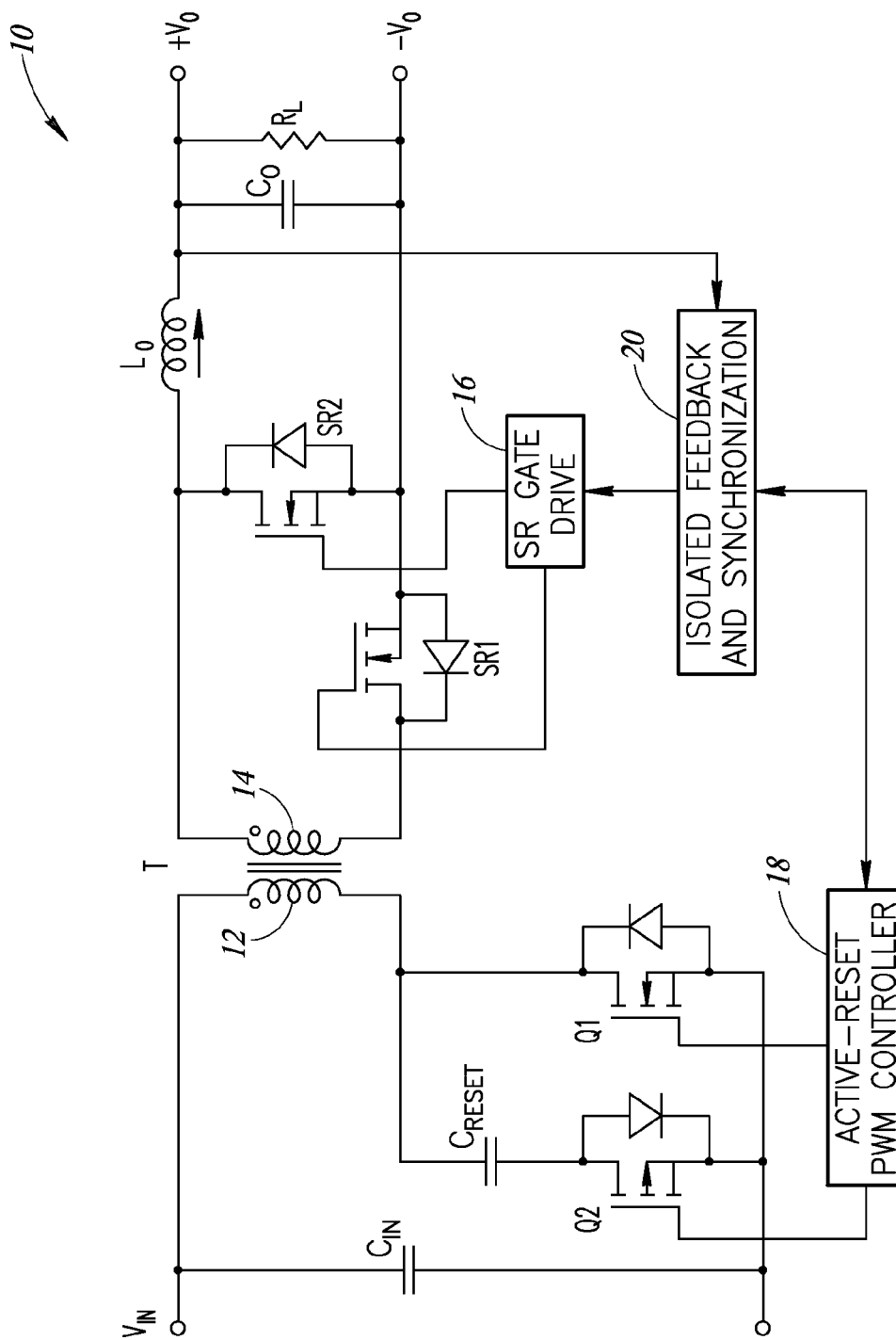
FIG. 1 is a schematic diagram of an active-clamp forward converter with active-control synchronous rectification.
Figure 2:
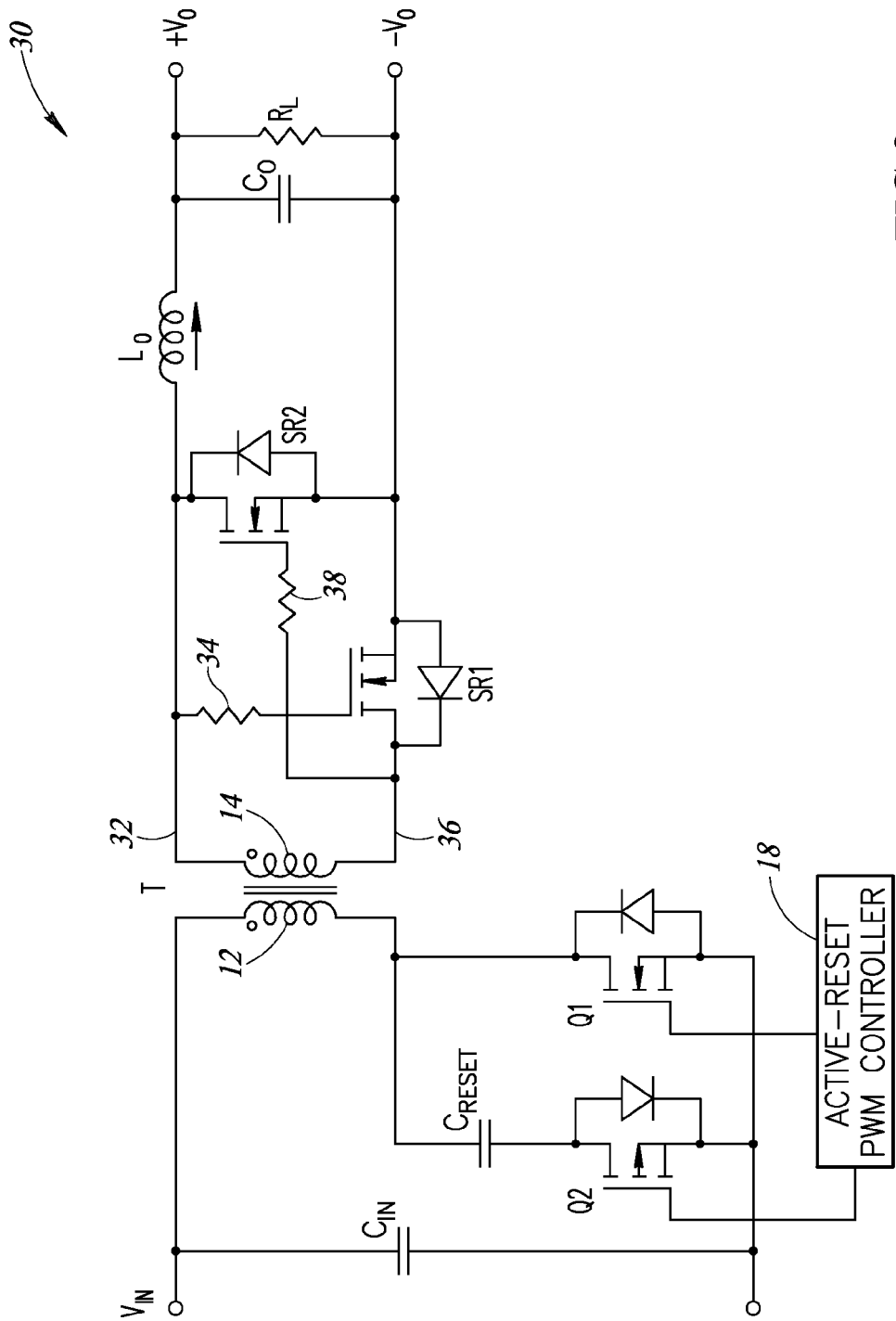
FIG. 2 is a schematic diagram of an active-clamp forward converter with self-driven synchronous rectification.
Figure 3:
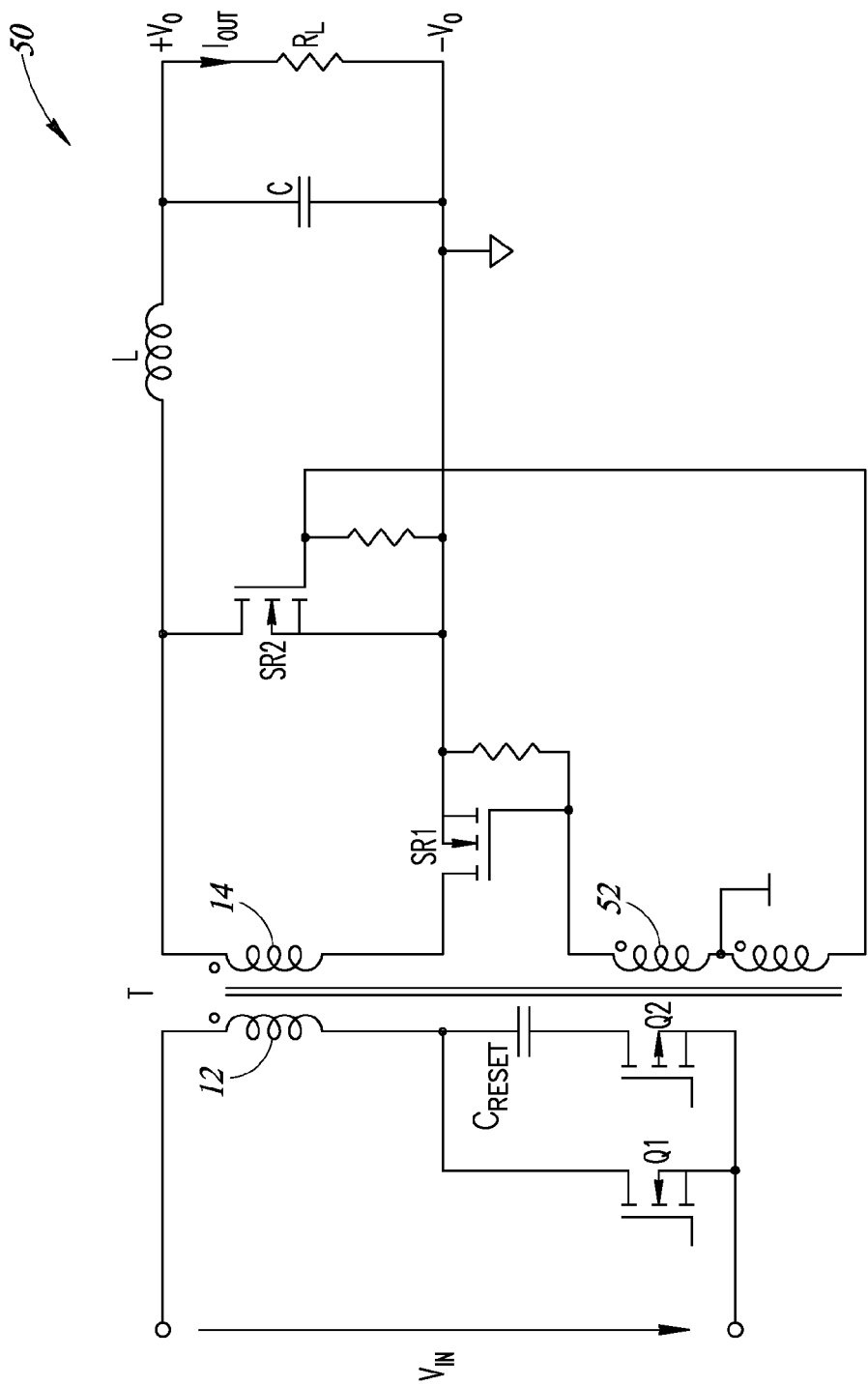
FIG. 3 is a schematic diagram of an active-clamp forward converter with self-driven synchronous rectification using a tertiary winding.
Figure 4:
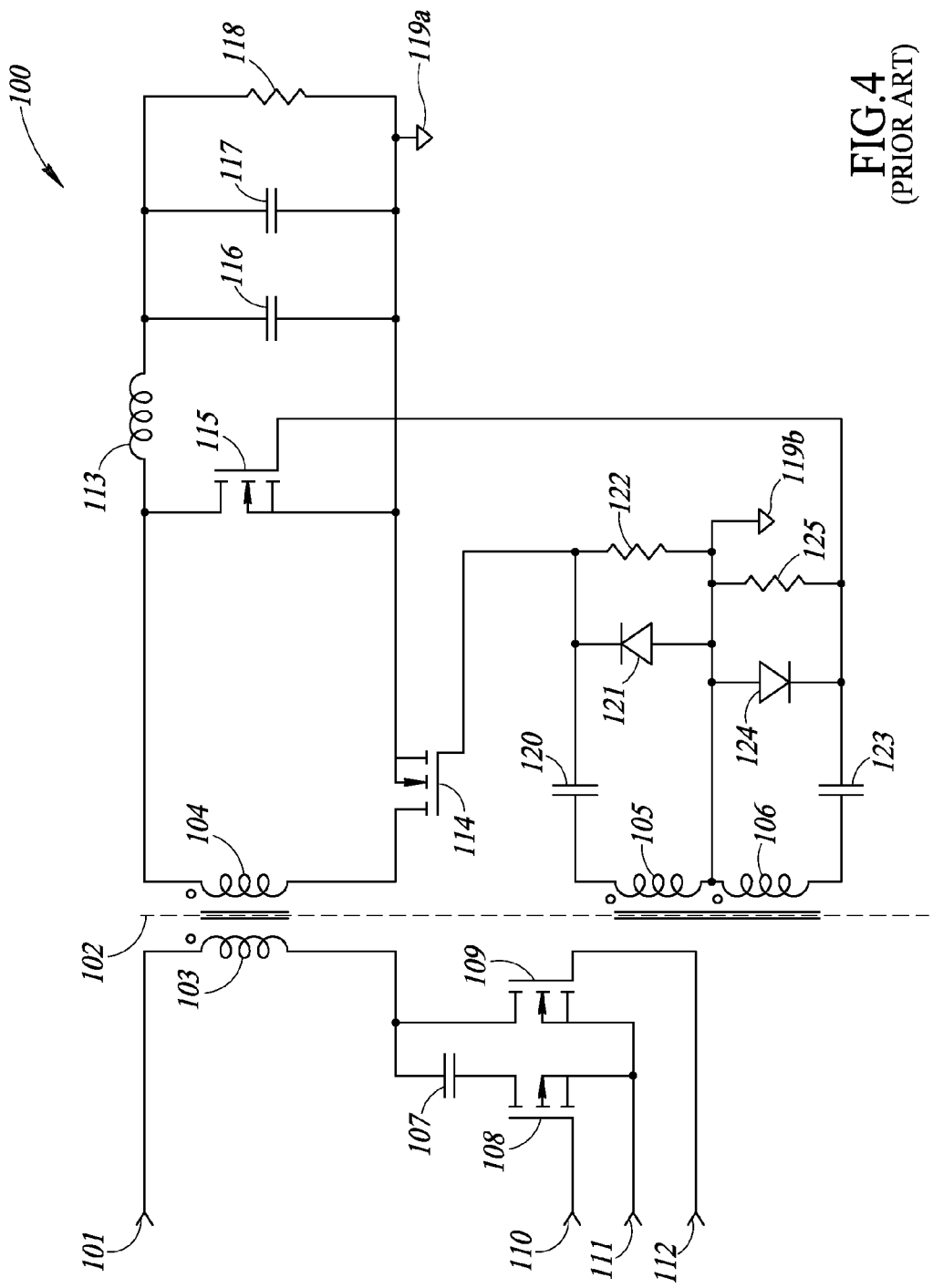
FIG. 4 is a schematic diagram of an active-clamp forward converter with self-driven synchronous rectification which sums the forward and reset voltage of a primary winding by a tertiary winding ratio of a transformer.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

One or more implementations of the present disclosure are directed to systems and methods for providing a self-driven synchronous rectification circuit for an active-clamp forward converter which includes automatically enhancing synchronous MOSFETs and maximizing input voltage range. The gate signals for the synchronous MOSFETs are derived from a unipolar magnetic coupling signal instead of a bipolarized magnetic coupling signal. The unipolar signal is retained for fully enhanced driving of the MOSFETs at low line voltage and the unipolar signal is automatically converted to a bipolar signal at high line amplitude due to line variance to maximize input voltage range by utilizing non-polarized characteristics of the MOSFET gate-to-source voltage (Vgs). The circuit permits efficient scaling for higher output voltages such as 12 volts DC or 15 volts DC, without requiring extra windings on the transformer of the forward converter.

One or more implementations disclosed herein overcome the inherent issues of conventional self-driven synchronous rectification schemes. The implementations achieve high efficiency, maximum power density, minimal part count, and maximum wide input range with highest output voltage (e.g., 12 VDC, 15 VDC) without requiring an extra winding on the transformer, and automatically maintain the gate drive signals for full enhancement of the synchronous rectifier switches. These features are difficult to achieve using conventional self-driven synchronous rectification methods; as such, methods are not able to achieve the wide input range concurrently with higher output voltages.

Figure 5:
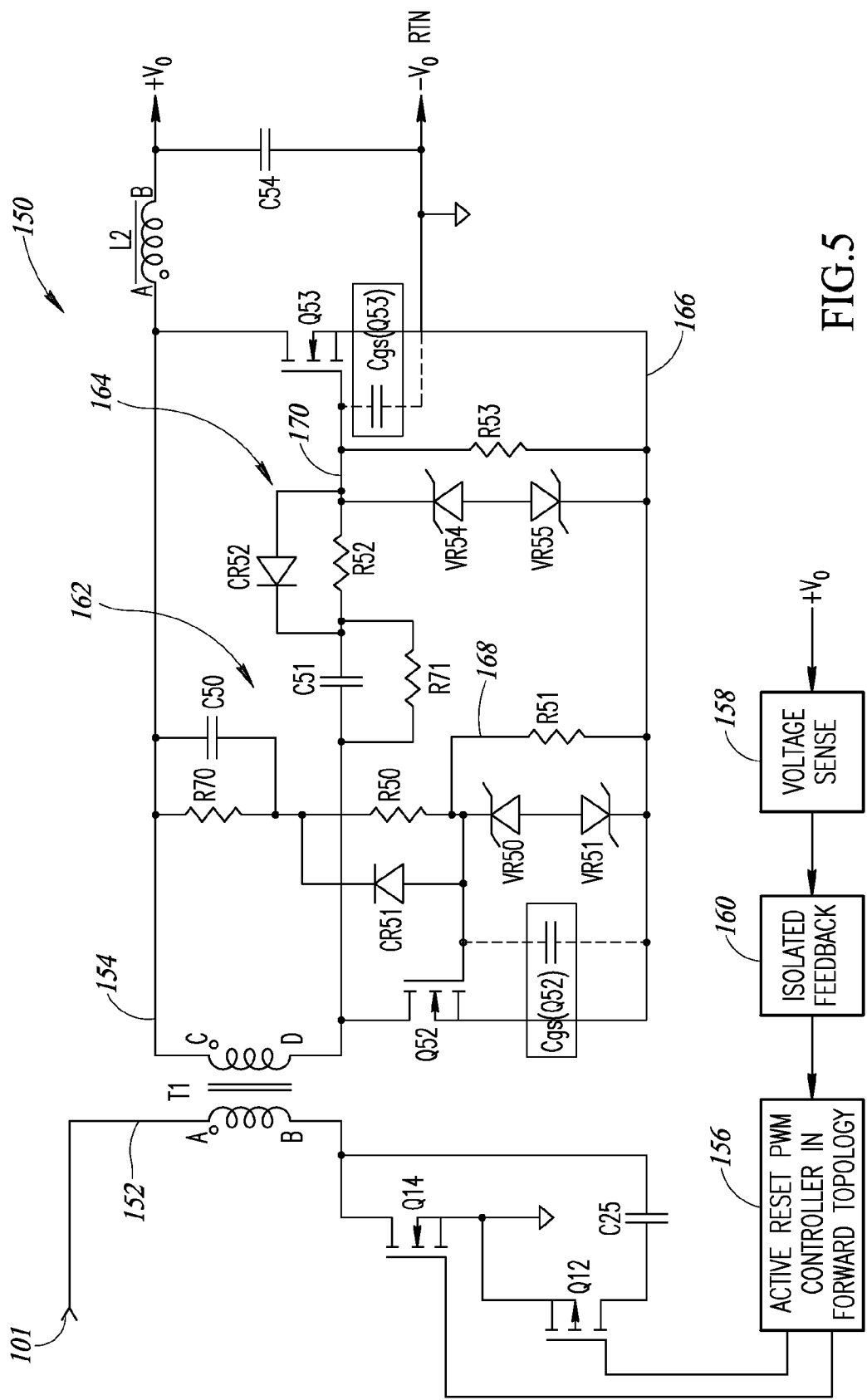
FIG. 5 is a schematic diagram of an active-clamp forward converter with automatic enhanced self-driven synchronous rectification directly from a main output winding, without a tertiary winding, even with a higher output DC voltage, such as 15V, according to one illustrated implementation.

FIG. 5 shows a schematic diagram for an active-clamp forward converter 150 which includes self-driven synchronous rectification, according to one implementation of the present disclosure. In this implementation, a DC voltage input Vin is connected to a primary winding 152 of a transformer T1 by a main switch Q14. A clamp circuit arrangement is also provided to limit the reset voltage. In particular, the main switch Q14 is shunted by a series connection of a clamp capacitor C25 and an auxiliary switch Q12. The conducting intervals of Q14 and Q12 are mutually exclusive.

A secondary winding 154 of the transformer T1 is connected to output leads +Vo and −Vo through a synchronous rectifier including MOSFET rectifying devices Q52 and Q53. Each of the rectifying devices Q52 and Q53 includes a body diode. With the main switch Q14 conducting, the input voltage Vin is applied across the primary winding 152. The secondary winding 154 is oriented in polarity to respond to the primary voltage with a current flow through an inductor L2, through the load (not shown) connected to the output leads +Vo and −Vo, and back through the switch Q52 to the secondary winding 154. Continuity of the current flow in the inductor L2 when the main switch Q14 is non-conducting is maintained by the current path provided by the conduction of the switch Q53. An output filter capacitor C54 shunts the output of the converter 150.

An active-reset PWM controller 156 may control the operation of the switches Q12 and Q14. The PWM controller 156 may receive feedback signals indicative of the voltage at the output leads +Vo and −Vo via a voltage sense circuit 158 and an isolated feedback circuit 160.

Conductivity of the two rectifier devices Q52 and Q53 is controlled by a first passive synchronous rectifier (SR) control circuit 162 and a second passive synchronous rectifier (SR) control circuit 164, respectively. The first passive SR control circuit 162 includes a first DC voltage divider which includes resistors R70 and R51. The first passive SR control circuit 162 also includes a first AC voltage divider which includes a capacitor C50 and an internal gate-source capacitance Cgs(Q52) of the switch Q52. The first passive SR control circuit 162 also includes a first control node voltage limiter circuit that includes zener diodes VR50 and VR51, and a first peak current limiter circuit which includes a resistor R50 and a diode CR51.

More specifically, the resistor R51 of the first DC voltage divider circuit is electrically coupled between a common node 166 to which the source nodes of the switches Q52 and Q53 are coupled and a gate or control node 168 of the switch Q52. The resistor R70 of the first DC voltage divider is electrically coupled between a first node C of the secondary winding 154 and the control node 168 of the switch Q52 through the resistor R50 and the diode CR51 of the first peak current limiter circuit.

The capacitor C50 of the first AC voltage divider is electrically coupled between the first node C of the secondary winding 154 and the control node 168 of the switch Q52 through the resistor R50 and diode CR51 of the peak current limiter circuit. The internal capacitor Cgs(Q52) of the switch Q52 provides a capacitance for the first AC voltage divider between the control node 168 of the switch Q52 and the common node 166.

The zener diodes VR50 and VR51 of the first control node voltage limiter circuit are coupled together in series between the common node 166 and the control node 168 of the switch Q52 with their anodes connected together ("anode-to-anode" connected).

The second passive SR control circuit 164 includes a second DC voltage divider which includes resistors R71 and R53, and a second AC voltage divider which includes a capacitor C51 and the internal gate-source capacitance Cgs (Q53) of the switch Q53. The second passive SR control circuit 164 also includes a second control node voltage limiter circuit that includes zener diodes VR54 and VR55, and a second peak current limiter circuit which includes a resistor R52 and a diode CR52.

More specifically, the resistor R53 of the second DC voltage divider circuit is electrically coupled between the common node 166 and a gate or control node 170 of the switch Q53. The resistor R71 of the second DC voltage divider is electrically coupled between a second node D of the secondary winding and the control node 170 of the switch Q53 through the resistor R52 and the diode CR52 of the second peak current limiter circuit.

The capacitor C51 of the second AC voltage divider is electrically coupled between the second node D of the secondary winding and the control node 170 of the switch Q53 through the resistor R52 and the diode CR52 of the second peak current limiter circuit. The internal capacitor Cgs(Q53) of the switch Q53 provides a capacitance for the second AC voltage divider between the control node 170 of the switch Q53 and the common node 166.

The zener diodes VR54 and VR55 of the second control node voltage limiter circuit are coupled together in series between the common node 166 and the control node 170 of the switch Q53 with their anodes connected together ("anode-to-anode" connected).

As noted above, the capacitors Cgs(Q52) and Cgs(Q53) are the measured gate-source capacitance of the MOSFET switches Q52 and Q53. Different MOSFETs will have different values. Thus, although the capacitors Cgs(Q52) and Cgs (Q53) are shown in FIG. 5 as discrete components for explanatory purposes, they are internal and unique to the MOSFET switches Q52 and Q53, respectively.

For the first control node voltage limiter circuit, the dynamic range or maximum input voltage range ratio is defined by the following equation:

$$\frac{2*V_F + V_{Z1} + V_{Z2}}{V_{GSmin}}$$

where $V_{GSmin}$ is the minimum $V_{GS}$ at which the MOSFET switch Q52 can be fully enhanced, $V_F$ is the forward voltage drop of diodes VR50 and VR51, and $V_{Z1}$ and $V_{Z2}$ are the zener voltages of the diodes VR50 and VR51, respectively.

For the second control node voltage limiter circuit, the dynamic range or maximum input voltage range ratio is defined by the following equation:

$$\frac{2*V_F + V_{Z1} + V_{Z2}}{V_{GSmin}}$$

where $V_{GSmin}$ is the minimum $V_{GS}$ at which the MOSFET switch Q53 can be fully enhanced, $V_F$ is the forward voltage drop of diodes VR54 and VR55, and $V_{Z1}$ and $V_{Z2}$ are the zener voltages of the zener diodes VR54 and VR55, respectively.

The zener diode VR50 plus the forward drop of the zener diode VR51 and the zener diode VR54 plus the forward drop of the zener diode VR55 set the maximum positive gate signal level at the respective control nodes 168 and 170 of the switches Q52 and Q53, respectively. The zener diodes VR51 and VR55 allow the gate signal at the respective control nodes 168 and 170 of the switches Q52 and Q53 to go negative when the amplitude is excessive. The zener diode VR51 plus the forward drop of the zener diode VR50 and the zener diode VR55 plus the forward drop of the zener diode VR54 also set the maximum negative gate signal at the respective control nodes 168 and 170 of the switches Q52 and Q53, respectively.

The zener diode pairs (e.g., diodes VR50 and VR51 or diodes VR54 and VR55) in conjunction with the AC voltage dividers function to automatically shift the voltage Vgs to be less than zero volts (i.e., negative voltage) at high line voltages. For example, if the converter 150 did not include the zener diodes VR51 and VR55, the zener diodes VR50 and VR54 would provide a mechanism to prevent the respective voltages Vgs from exceeding the Vgs maximum rating. However, such an implementation would be very costly in terms of efficiency and power dissipation by the zener diodes VR50 and VR54, as the zener diodes VR50 and VR54 would be hard clipping the Vgs at high zener current.

A design flow for achieving one or more implementations of the present disclosure is now described. First, for an active-reset or active-clamp forward converter topology, the maximum required input voltage range and output voltage are determined. Then, the required transformer turns ratio is determined. Additionally, the gate-source intrinsic capacitance Cgs of the switches Q52 and Q53 are measured.

The minimum voltage and maximum voltage of the node C of the transformer T1 for the determined input range and transformer ratio may be determined. Based on the measured Cgs(Q52) and Cgs(Q53), the required values for the capacitors C50 and C51, respectively, for the AC voltage dividers may be calculated. The required DC voltage divider resistor values R70/R51 and R71/R53 may also be calculated.

The required zener voltage for the zener diodes VR50, VR51, VR54 and VR55 may be calculated so that the gate voltages of the switches Q52 and Q53 do not exceed the maximum positive voltage Vgs (diodes VR50 and VR54) and the maximum negative voltage Vgs (diodes VR51 and VR55).

FIGS. 6A-6C show various waveforms for a 15 VDC output converter at an input voltage of 16 V. FIGS. 7A-7C show various waveforms for a 15 VDC output converter at an input voltage of 50 V. In particular, FIGS. 6A and 7A show a secondary forward voltage V(sf) at the node C (FIG. 5) of the transformer T1, and a secondary reset voltage V(nr) at the node D of the transformer. FIGS. 6B and 7B show the input voltage V(in), the output voltage V(out), and the voltage V(ds) at the drain node of the primary power switch Q14. FIGS. 6C and 7C show the voltage V(gsq53) for the catch synchronous switch Q53 and the voltage V(gsq52) for the forward synchronous switch Q52.

For an input voltage of 16 V, the Vgs pedestal or turn-off voltage is about −1 V for Q52 and about −15 V for Q53. Likewise, the turn-on voltage is about 7 V for Q52 and 16 V for Q53. The Vgs voltage levels in FIG. 6C show that both MOSFETs Q52 and Q53 can be safely turned off while also providing sufficient voltage for full enhancement operation. At 50 V input shown in FIGS. 7A-7C, the pedestal Vgs of Q52 is about −12 V and the turn-on voltage is about 15 V. For Q53, the pedestal Vgs is about −2 V and the turn-on voltage is about 12 V. In both cases, the MOSFETs Q52 and Q53 are guaranteed to turn-off and to operate in a fully enhanced mode.

The implementations of the present disclosure successfully and automatically convert a unipolar signal into a bipolar signal when the amplitude is increasing due to line variance more than a voltage level set by zener diodes VR50 and VR54 (FIG. 5) to prevent exceeding Vgs rating of the MOSFETS Q52 and Q53 in positive polarity. The extra voltage is converted safely into the negative polarity to fully utilize non-polarized characteristics of Vgs without unnecessary loss.

FIGS. 6A-6C and 7A-7C show the implementations disclosed herein may be scaled to at least 15 VDC output. Components may be selected to ensure the MOSFETs can be turned off and fully enhanced at the lowest and highest line voltages.

The voltage scaling is required for the high voltage node C of the transformer T1 which especially occurs on higher output voltage models such as 15 VDC. The auto scaling of Vgs can be seen when comparing the voltage at the node C (FIG. 5) and the derived voltage Vgs of Q53 in FIGS. 7A and 7C for an input voltage Vin of 50 V. It is noted that the voltage at the node C (FIG. 7A) reaches as high as 75 V, but the voltage V(gsq53) (FIG. 7C) of the switch Q53 is maintained between −2 V and +15 V.

Figure 8:
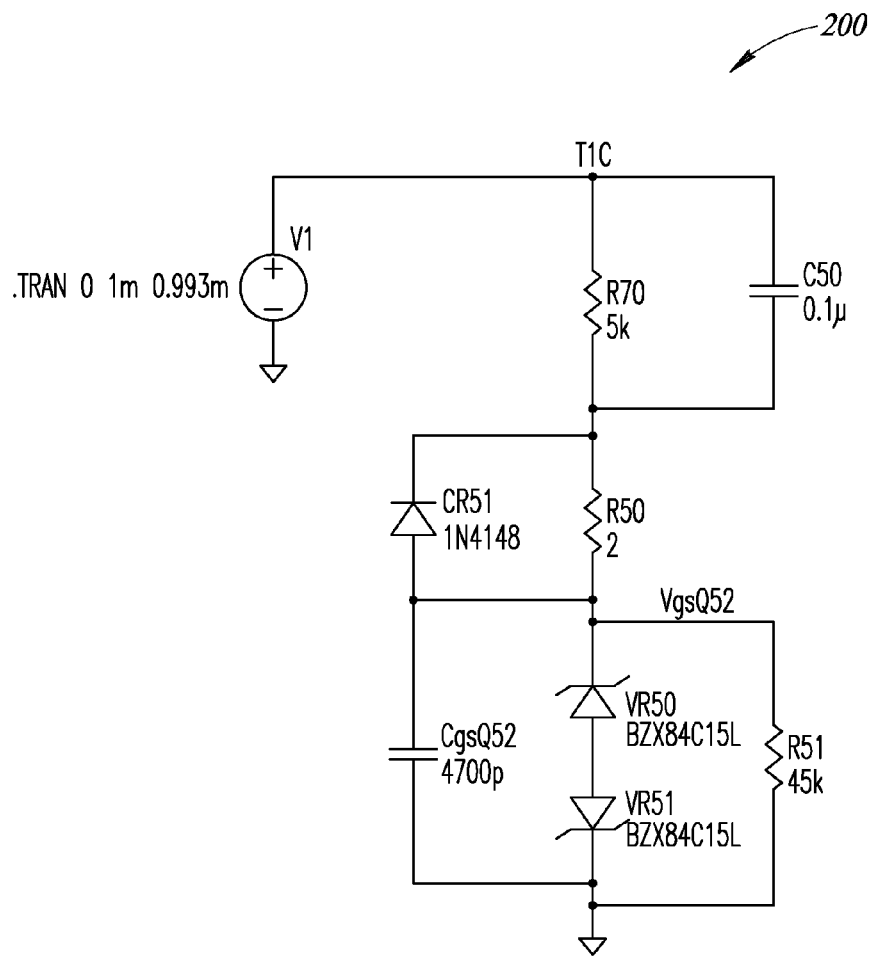
FIG. 8 is a schematic diagram of a simulated passive synchronous rectifier (SR) control circuit for an active-clamp forward converter, according to one illustrated implementation.

FIG. 8 shows a simulated circuit 200 which implements the synchronous rectification schemes of the present disclosure. FIGS. 9-12 show various waveforms for the simulated circuit 200. The values for the simulated circuit 200 are selected for a design of 16-80 V input voltage range and a 3.3 V output voltage. For the sake of clarity, only the first passive SR control circuit 162 (FIG. 5) which controls the forward synchronous switch Q52 is discussed, but the same principle may be applied for the second passive SR control circuit 164 which controls the catch synchronous switch Q53.

The simulated circuit discussed below with reference to FIGS. 9-14 includes the following values for the components of the first passive SR control circuit 162 (FIG. 5): capacitor C50=0.1 μF; resistor R70=5 kΩ; resistor R50=2Ω; resistor R51=45 kΩ; internal capacitor Cgs(Q52)=4700 pF; zener diodes VR50 and VR51=15 V zener voltage.

Figure 10:
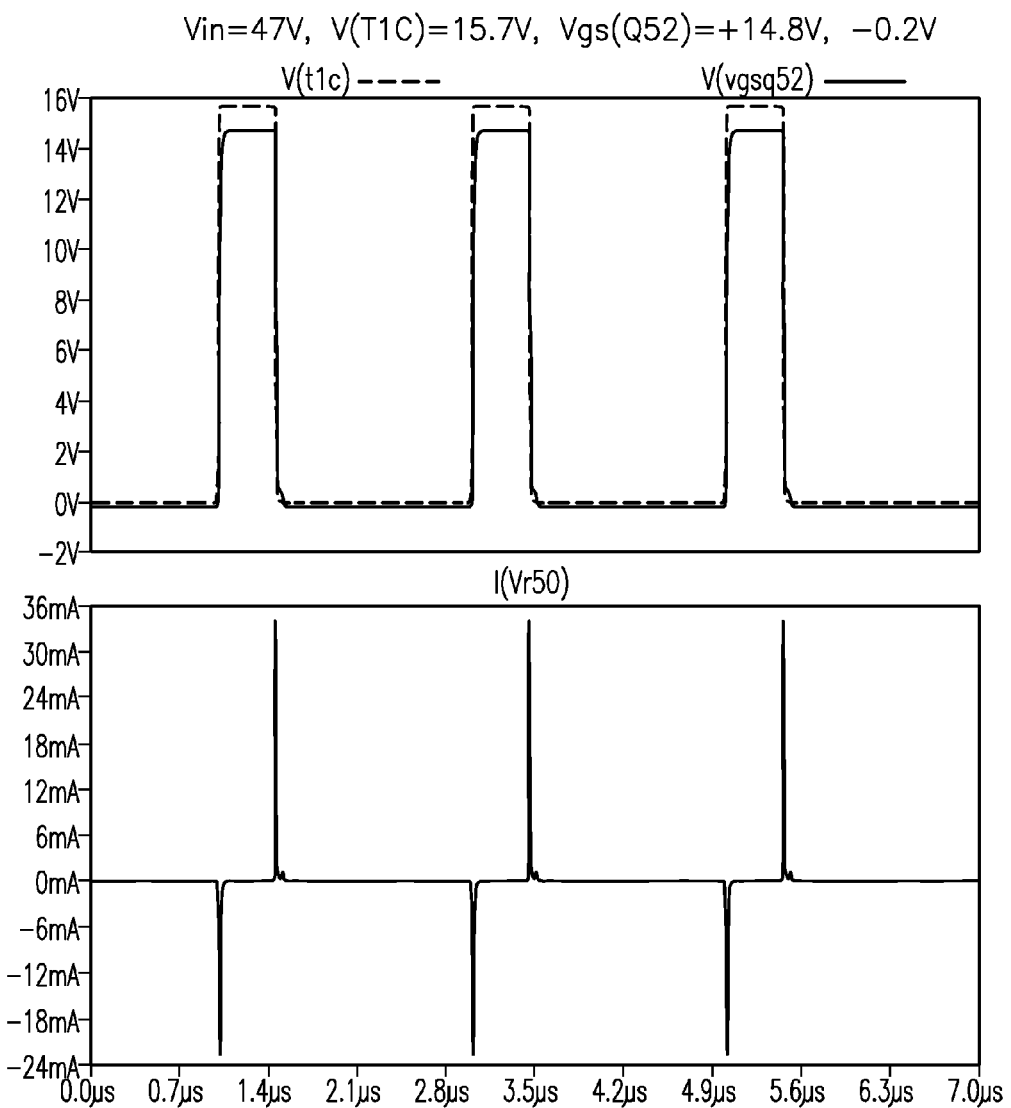
FIG. 10 depicts a gate-source voltage Vgs for a forward synchronous switch of an active-clamp forward converter and a voltage Vsec at a secondary node C of a transformer when a maximum voltage at the secondary node C is 15.7 V, according to one illustrated implementation.
Figure 11:
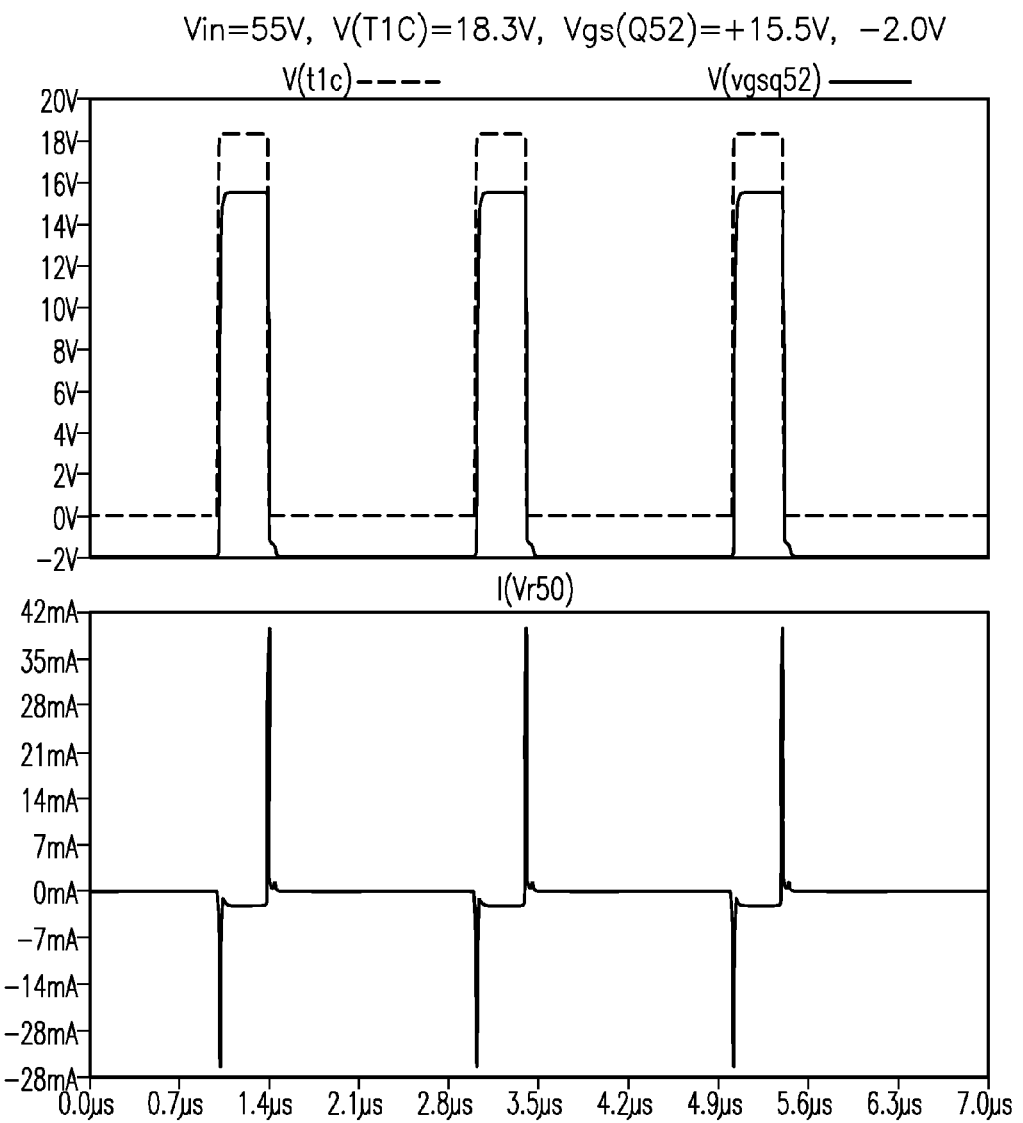
FIG. 11 depicts a gate-source voltage Vgs for a forward synchronous switch of an active-clamp forward converter and a voltage Vsec at a secondary node C of a transformer when a maximum voltage at the secondary node C is 18.3 V, according to one illustrated implementation.
Figure 12:
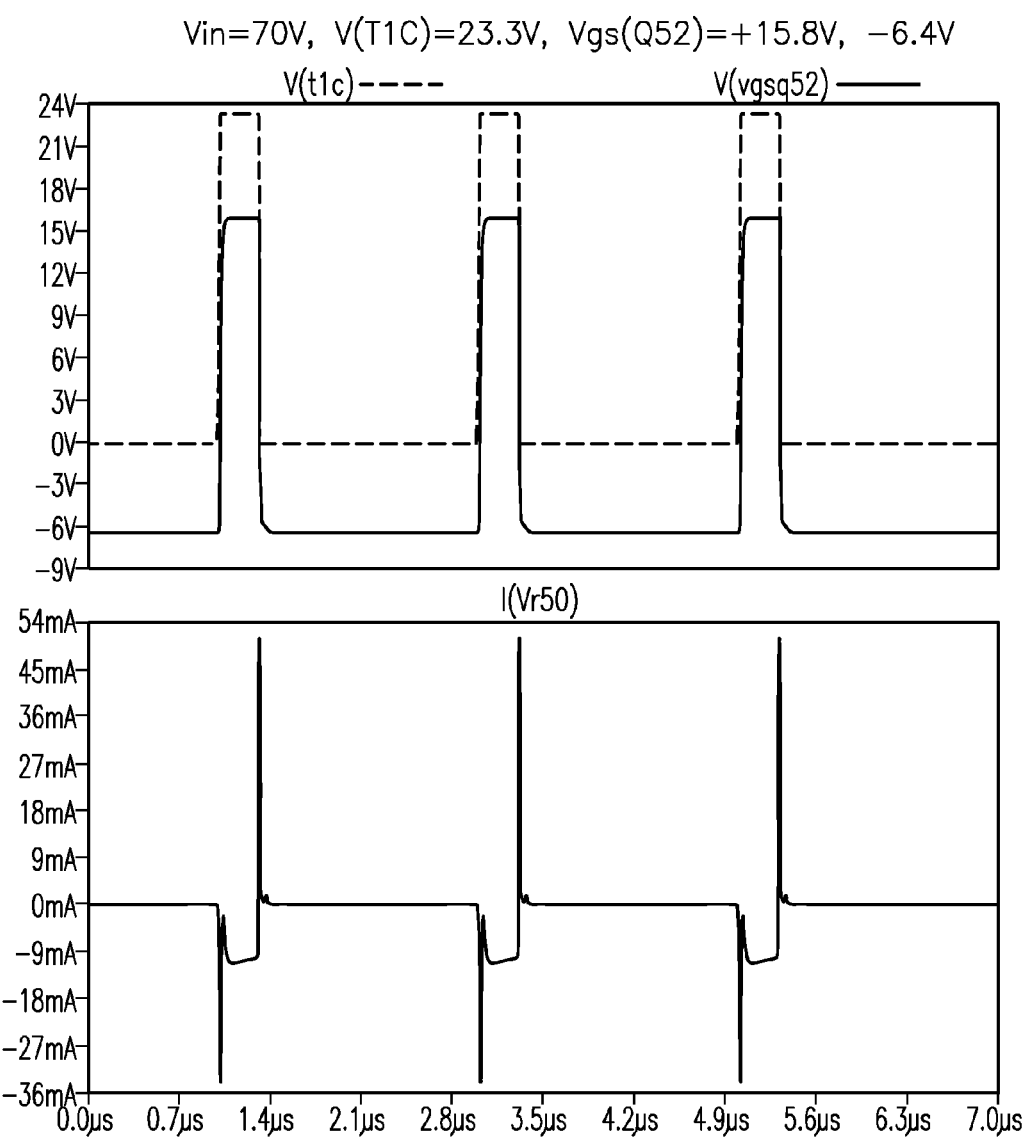
FIG. 12 depicts a gate-source voltage Vgs for a forward synchronous switch of an active-clamp forward converter and a voltage Vsec at a secondary node C of a transformer when a maximum voltage at the secondary node C is 23.3 V, according to one illustrated implementation.

FIGS. 9-12 show the gate-source voltage Vgs (or Vgsq52) for the switch Q52 and the voltage Vsec (or $Vt_{1C}$) at the secondary node C of the transformer when a maximum voltage at the secondary node C is 5.3 V (FIG. 9), 15.7 V (FIG. 10), 18.3 V (FIG. 11), and 23.3 V (FIG. 12). Each of the FIGS. 9-12 also shows the current I(Vr50) which flows through the zener diode VR50 (FIGS. 5 and 8).

Figure 9:
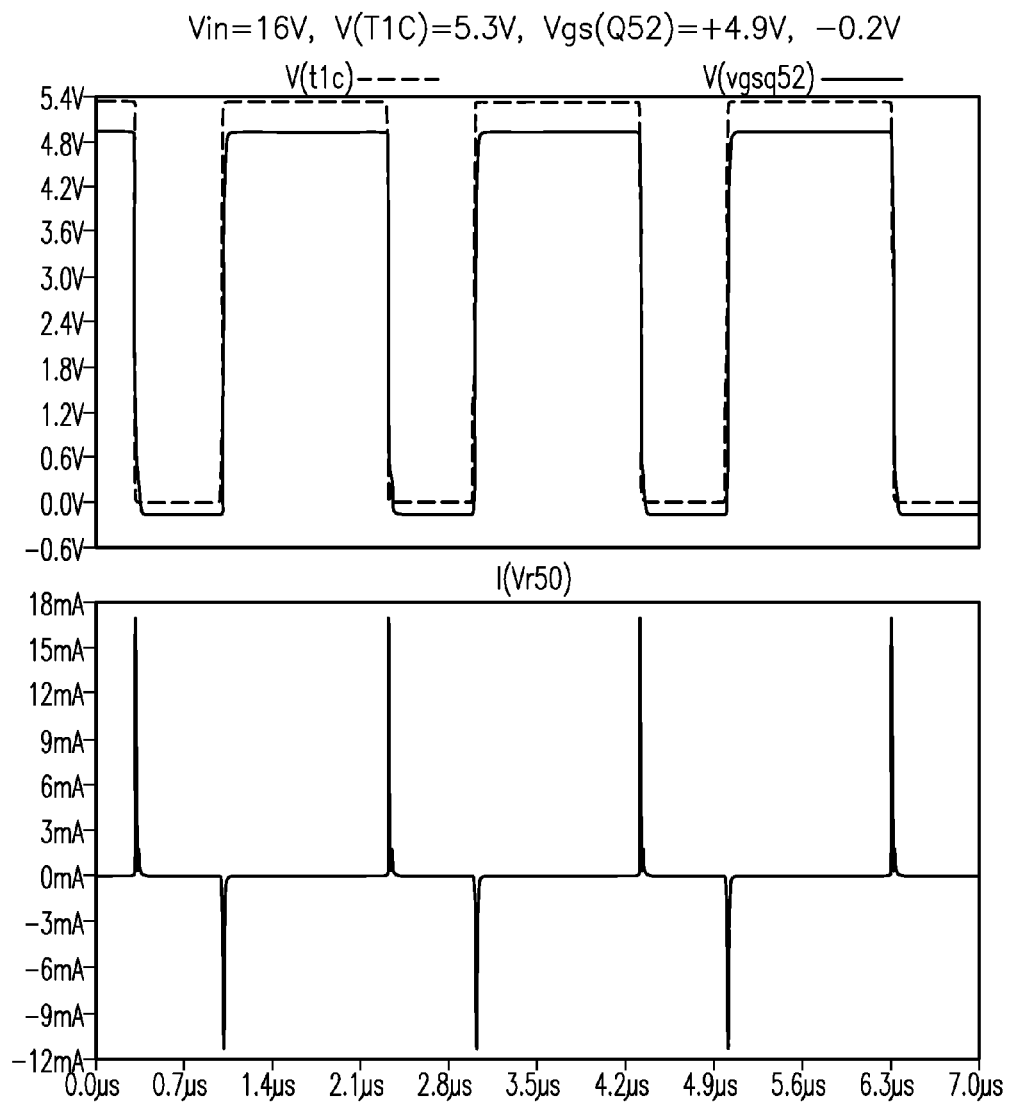
FIG. 9 depicts a gate-source voltage Vgs for a forward synchronous switch of an active-clamp forward converter and a voltage Vsec at a secondary node C of a transformer when a maximum voltage at the secondary node C is 5.3 V, according to one illustrated implementation.

From FIG. 9, it can be seen that the voltage Vgs is essentially a scaled down version of Vsec from the secondary winding of the transformer. At low line (FIG. 9), the voltage Vgs is derived primarily by the voltage dividers for fully enhanced operation during the primary switch D time and completely off during the primary switch 1-D time. As the voltage Vsec increases, the voltage Vgs approaches that of the zener VR50 (i.e., 15 V in this example). Prior to reaching the zener voltage of 15 V, the voltage Vgs is primarily a unipolar signal as shown in FIGS. 9 and 10.

Once the voltage Vsec is sufficiently high such that the voltage Vgs reaches the zener voltage plus a diode voltage drop, the voltage Vgs positive peak stays fixed as shown in FIG. 11, and the Vgs pedestal voltage starts to become more negative. FIG. 12 shows that the voltage Vgs remains fixed at about +15.8 V while the pedestal voltage is about −6.4V. That is, the circuit successfully converts the unipolar signal, Vsec, into an automatic bipolar signal, Vgs, dependent on the input voltage. The negative voltage Vgs is created by the zener diode VR50, the zener diode VR51 (in forward conduction), and the AC voltage divider forcing the gate voltage pedestal to move negative.

As shown in FIGS. 9-12, the current I(Vr50) through the zener diode VR50 is very small even at high input voltages. This is a significant feature of one or more of the implementations discussed herein. The power dissipation through the zener diodes VR50 and VR51 is minimal as the zener diodes are not heavily clamping the voltage Vgs. This behavior is further discussed below with reference to FIGS. 13 and 14.

Figure 13:
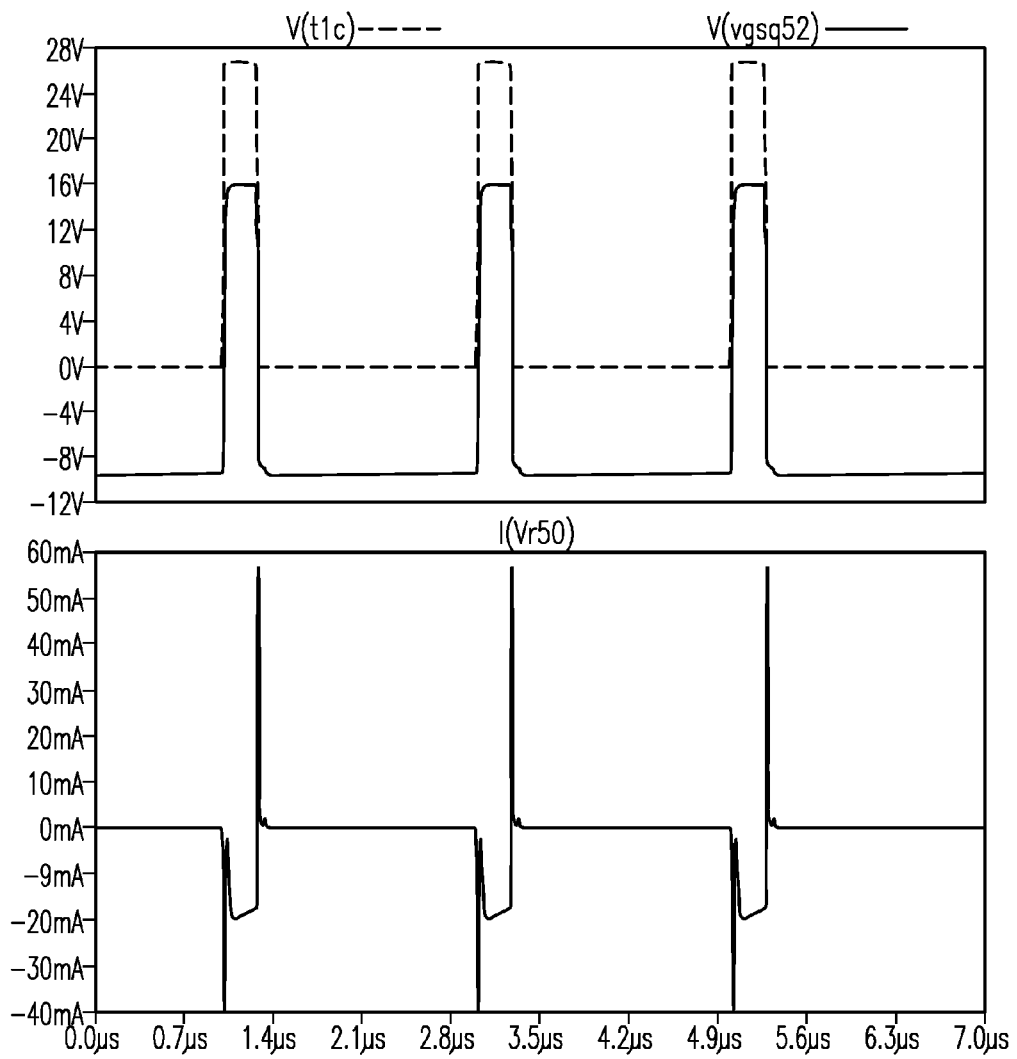
FIG. 13 depicts a gate-source voltage Vgs for a forward synchronous switch of an active-clamp forward converter and a voltage Vsec at a secondary node C of a transformer when a maximum voltage at the secondary node C is 26.7 V, according to one illustrated implementation.
Figure 14:
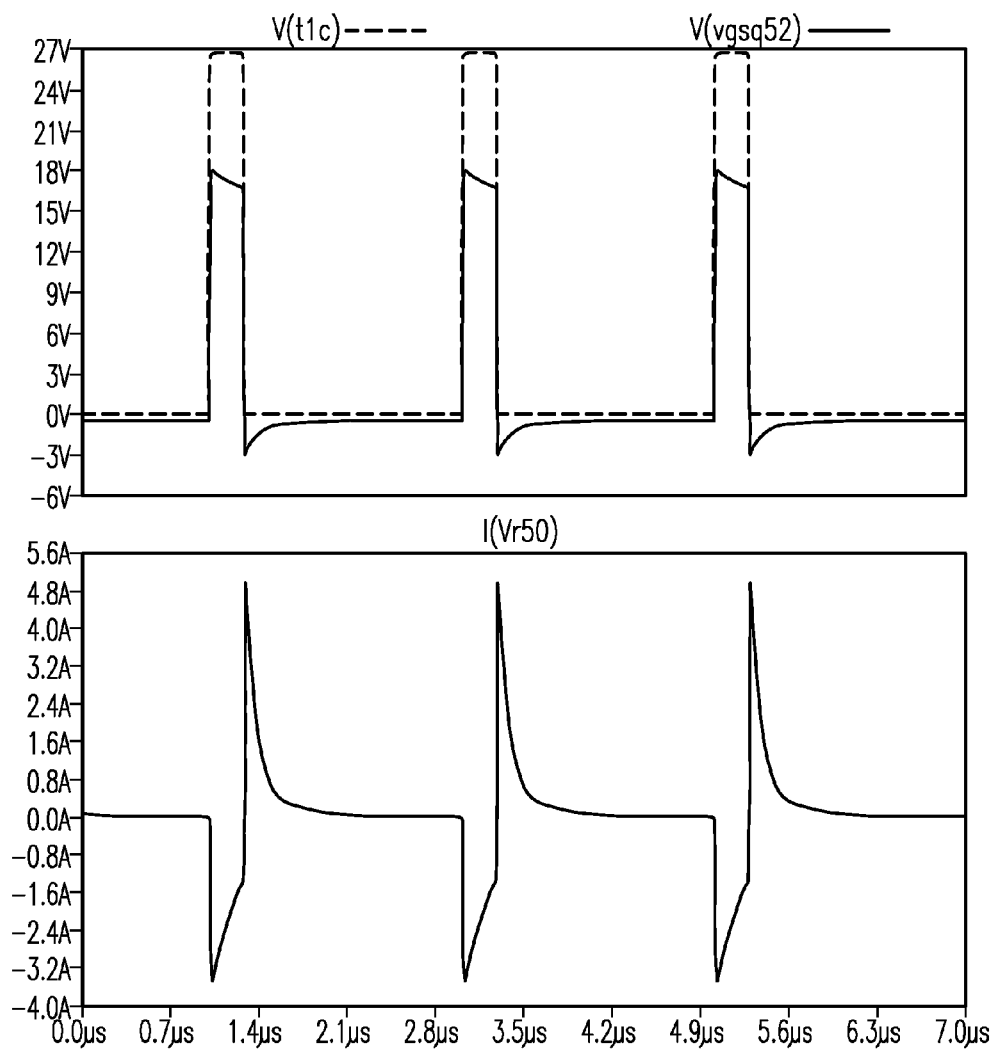
FIG. 14 depicts a gate-source voltage Vgs for a forward synchronous switch of an active-clamp forward converter and a voltage Vsec at a secondary node C of a transformer when a maximum voltage at the secondary node C is 26.7 V, wherein the forward converter does not include a zener diode which allows the gate signal for the forward synchronous switch to go negative.

FIG. 13 shows the gate-source voltage Vgs for the switch Q52 and the voltage Vsec at the secondary node C of the transformer when the maximum voltage at the secondary node C is 26.7 V. FIG. 14 shows the gate-source voltage Vgs for the switch Q52 and the voltage Vsec at the secondary node C of the transformer when the maximum voltage at the secondary node C is 26.7 V, and the zener diode VR51 is removed (or shorted) so that the anode of the zener diode VR50 is directly electrically coupled to the ground reference.

As shown, the voltage Vgs in FIG. 14 remains unipolar. This is because the voltage Vgs is clamped hard by the zener diode VR50 (FIGS. 5 and 8). Consequently, the RMS current of the zener diode VR50 in the implementation depicted in FIG. 14 is 1.2 A compared to the RMS current of just 7.6 mA in the implementation of the present disclosure depicted in FIG. 13. The average power in the zener diode VR50 in the implementation depicted in FIG. 14 is 5.7 W, while the average power in the zener diode VR50 in the implementation of the present disclosure depicted in FIG. 13 is only 33 mW. Minimizing the power dissipation in the zener diode VR50 allows higher efficiency and permits physically smaller components to be used.

One or more implementations of the present disclosure provide numerous advantageous features. For example, in one or more implementations, the gate signals which drive the synchronous rectifier switches are derived from a unipolar magnetically coupling instead of bipolarized magnetic coupling signal. As another example, the bipolar and negative voltage of the gate signals can enhance turn-off of the MOSFET when exposed to radiation effects. Further, the magnetic unipolar signal is also maintained at low line to provide the necessary gate drive to fully enhance the MOSFETs.

As discussed above, in some implementations the magnetic unipolar signal automatically converts from unipolar to bipolar at high line to maximize input voltage range. The implementations discussed herein also provide scaling ability to allow higher output voltages such as 12 VDC or 15 VDC, without requiring extra windings. Further, as discussed above, there is minimal power dissipation through the pairs of zener diodes (e.g., zener diodes VR50 and VR51, or zener diodes VR54 and VR55 of FIG. 5).

One or more implementations of the present disclosure also have numerous advantages. For instance, one or more implementations discussed herein do not allow shoot through current even with large line variance so the circuits may operate at high frequency (e.g., greater than 500 kHz). Further, the implementations discussed herein do not require an extra tertiary winding for higher output voltages such as 15 VDC or for a wide input voltage range. Moreover, the gate voltages on the forward and catch synchronous MOSFETs are automatically converted from unipolar to bipolar depending on the input voltage value.

Further, as discussed above, the anode-to-anode connected zener diodes are not hard clamped, so there is minimal power dissipation on the zener diodes while improving the efficiency. In some implementations, the upper RC time constant and the lower RC time constant may be intentionally offset to guarantee turn-off of the synchronous switches. Additionally, the energy stored in the gate drive circuitry is minimal, which provides faster transient response and no shutdown shoot through current.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, some or all of the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional Patent Application No. 62/193,755, filed Jul. 17, 2015 are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An automatic enhanced self-driven synchronous rectification (AESDSR) control circuit for an active-clamp forward converter, the active clamp forward converter comprising a transformer having a primary winding and a secondary winding, a primary circuit electrically coupled to the primary winding, a secondary circuit electrically coupled to the secondary winding, the secondary circuit comprising first and second synchronous rectifying elements electrically connected in series with each other and electrically connected in parallel to the secondary winding, the first and second synchronous rectifying elements being electrically coupled together at a common node, the first and second synchronous rectifying elements comprising respective first and second control nodes, the AESDSR control circuit comprising:
   a first passive synchronous rectifier (SR) control circuit comprising:
      a first direct current (DC) voltage divider circuit electrically coupled between a first node of the secondary winding and the common node, the first DC voltage divider circuit having an output electrically connected to the first control node of the first synchronous rectifying element;
      a first alternating current (AC) voltage divider circuit electrically coupled between the first node of the secondary winding and the common node, the first AC voltage divider circuit having an output electrically connected to the first control node of the first synchronous rectifying element; and
      a first control node voltage limiter circuit electrically coupled between the first control node of the first synchronous rectifying element and the common node; and
   a second passive SR control circuit comprising:
      a second DC voltage divider circuit electrically coupled between a second node of the secondary winding and the common node, the second DC voltage divider circuit having an output electrically connected to the second control node of the second synchronous rectifying element;
      a second AC voltage divider circuit electrically coupled between the second node of the secondary winding and the common node, the second AC voltage divider circuit having an output electrically connected to the second control node of the second synchronous rectifying element; and
      a second control node voltage limiter circuit electrically coupled between the second control node of the second synchronous rectifying element and the common node.

2. The AESDSR control circuit of claim 1 wherein the first passive SR control circuit comprises a first peak current limiter circuit electrically coupled between the common node and the first node of the secondary winding, and the second passive SR control circuit comprises a second peak current limiter circuit electrically coupled between the common node and the second node of the secondary winding.

3. The AESDSR control circuit of claim 2 wherein the first peak current limiter circuit comprises a first resistor coupled in parallel with a first diode, and the second peak current limiter circuit comprises a second resistor coupled in parallel with a second diode.

4. The AESDSR control circuit of claim 1 wherein each of the first DC voltage divider circuit and the second DC voltage divider circuit comprises at least two resistors.

5. The AESDSR control circuit of claim 1 wherein the first AC voltage divider circuit comprises a capacitor and an internal capacitance of the first synchronous rectifying element, and the second AC voltage divider circuit comprises a capacitor and an internal capacitance of the second synchronous rectifying element.

6. The AESDSR control circuit of claim 1 wherein the first control node voltage limiter circuit comprises a first zener diode and a second zener diode electrically connected anode-to-anode with each other, and the second control node voltage limiter circuit comprises a third zener diode and a fourth zener diode electrically connected anode-to-anode with each other.

7. The AESDSR control circuit of claim 1 wherein the first control node voltage limiter circuit comprises:
   a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and
   the second control node voltage limiter circuit comprises:
   a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

8. An automatic enhanced self-driven synchronous rectification (AESDSR) control circuit for an active-clamp forward converter, the active clamp forward converter comprising a transformer having a primary winding and a secondary winding, a primary circuit electrically coupled to the primary winding, a secondary circuit electrically coupled to the secondary winding, the secondary circuit comprising first and second synchronous rectifying elements electrically connected in series with each other and electrically connected in parallel to the secondary winding, the first and second synchronous rectifying elements being electrically coupled together at a common node, the first and second synchronous rectifying elements comprising respective first and second control nodes, the AESDSR circuit comprising:

a first passive synchronous rectifier (SR) control circuit comprising:
a first direct current (DC) voltage divider circuit electrically coupled between a first node of the secondary winding and the common node, the first DC voltage divider circuit having an output electrically connected to the first control node of the first synchronous rectifying element, the first DC voltage divider comprising at least two resistors;
a first alternating current (AC) voltage divider circuit electrically coupled between the first node of the secondary winding and the common node, the first AC voltage divider circuit having an output electrically connected to the first control node of the first synchronous rectifying element, the first AC voltage divider circuit comprises a capacitor and an internal capacitance of the first synchronous rectifying element; and
a first control node voltage limiter circuit electrically coupled between the first control node of the first synchronous rectifying element and the common node, the first control node voltage limiter circuit comprises a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and
a second passive synchronous rectifier (SR) control circuit comprising:
a second direct current (DC) voltage divider circuit electrically coupled between a second node of the secondary winding and the common node, the second DC voltage divider circuit having an output electrically connected to the second control node of the second synchronous rectifying element, the second DC voltage divider comprising at least two resistors;
a second alternating current (AC) voltage divider circuit electrically coupled between the second node of the secondary winding and the common node, the second AC voltage divider circuit having an output electrically connected to the second control node of the second synchronous rectifying element, the second AC voltage divider circuit comprises a capacitor and an internal capacitance of the second synchronous rectifying element; and
a second control node voltage limiter circuit electrically coupled between the second control node of the second synchronous rectifying element and the common node, the second control node voltage limiter circuit comprises a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

9. The AESDSR control circuit of claim 8 wherein the first passive SR control circuit comprises a first peak current limiter circuit electrically coupled between the common node and the first node of the secondary winding, and the second passive SR control circuit comprises a second peak current limiter circuit electrically coupled between the common node and the second node of the secondary winding.

10. The AESDSR control circuit of claim 9 wherein the first peak current limiter circuit comprises a first resistor coupled in parallel with a first diode, and the second peak current limiter circuit comprises a second resistor coupled in parallel with a second diode.

11. An active-clamp forward converter, comprising:
a transformer having a primary winding and a secondary winding;
a primary circuit electrically coupled to the primary winding;
a secondary circuit electrically coupled to the secondary winding, the secondary circuit comprising first and second synchronous rectifying elements electrically connected in series with each other and electrically connected in parallel to the secondary winding, the first and second synchronous rectifying elements being electrically coupled together at a common node, the first and second synchronous rectifying elements comprising respective first and second control nodes; and
an automatic enhanced self-driven synchronous rectification (AESDSR) control circuit comprising:
a first passive synchronous rectifier (SR) control circuit comprising:
a first direct current (DC) voltage divider circuit electrically coupled between a first node of the secondary winding and the common node, the first DC voltage divider circuit having an output electrically connected to the first control node of the first synchronous rectifying element;
a first alternating current (AC) voltage divider circuit electrically coupled between the first node of the secondary winding and the common node, the first AC voltage divider circuit having an output electrically connected to the first control node of the first synchronous rectifying element; and
a first control node voltage limiter circuit electrically coupled between the first control node of the first synchronous rectifying element and the common node; and
a second passive SR control circuit comprising:
a second DC voltage divider circuit electrically coupled between a second node of the secondary winding and the common node, the second DC voltage divider circuit having an output electrically connected to the second control node of the second synchronous rectifying element;
a second AC voltage divider circuit electrically coupled between the second node of the secondary winding and the common node, the second AC voltage divider circuit having an output electrically connected to the second control node of the second synchronous rectifying element; and
a second control node voltage limiter circuit electrically coupled between the second control node of the second synchronous rectifying element and the common node.

12. The active-clamp forward converter of claim 11 wherein each of the first and second synchronous rectifying elements comprises a metal oxide semiconductor field effect transistor.

13. The active-clamp forward converter of claim 11 wherein the first passive SR control circuit comprises a first peak current limiter circuit electrically coupled between the common node and the first node of the secondary winding, and the second passive SR control circuit comprises a second peak current limiter circuit electrically coupled between the common node and the second node of the secondary winding.

14. The active-clamp forward converter of claim 13 wherein the first peak current limiter circuit comprises a first resistor coupled in parallel with a first diode, and the second peak current limiter circuit comprises a second resistor coupled in parallel with a second diode.

15. The active-clamp forward converter of claim 11 wherein each of the first DC voltage divider circuit and the second DC voltage divider circuit comprises at least two resistors.

16. The active-clamp forward converter of claim 11 wherein the first AC voltage divider circuit comprises a capacitor and an internal capacitance of the first synchronous rectifying element, and the second AC voltage divider circuit comprises a capacitor and an internal capacitance of the second synchronous rectifying element.

17. The active-clamp forward converter of claim 11 wherein the first control node voltage limiter circuit comprises a first zener diode and a second zener diode electrically connected anode-to-anode with each other, and the second control node voltage limiter circuit comprises a third zener diode and a fourth zener diode electrically connected anode-to-anode with each other.

18. The active-clamp forward converter of claim 11 wherein the first control node voltage limiter circuit comprises:
 a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and
 the second control node voltage limiter circuit comprises:
  a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

19. An active-clamped power converter, comprising:
 a pair of input terminals supplied with input direct current (DC) voltage;
 a pair of output terminals which outputs DC voltage;
 a transformer having a primary winding and a secondary winding;
 a primary circuit electrically coupled to the input terminals and the primary winding of the transformer;
 a secondary circuit electrically coupled to the output terminals and the secondary winding of the transformer;
 a control circuit operatively coupled to at least one of the output terminals to control the primary circuit to produce a main switch control signal and a subsidiary switch control signal;
 the primary circuit comprising:
  a main switch electrically coupled in series with the primary winding of the transformer to form a primary series connection circuit and operable responsive to the main switch control signal to be selectively put into an on-state and an off-state, the primary series connection circuit being electrically coupled between the input terminals; and
  a first series circuit, connected in parallel with the primary winding of the transformer, comprising a clamping capacitor and a subsidiary switch which is operable responsive to the subsidiary control signal to be selectively put into an on-state and an off-state, the subsidiary switch carrying out reverse operation with the main switch to clamp a primary reset voltage appearing at the primary winding of the transformer;
 the secondary circuit comprising:
  a synchronous rectifier connected in parallel to the secondary winding of the transformer, the synchronous rectifier comprising:
   a second series circuit, electrically coupled in parallel to the secondary winding of the transformer, the second series circuit comprising first and second synchronous rectifying elements which are operable in synchrony with the main switch, the first and the second synchronous rectifying elements having first and second control nodes, respectively, the first and the second synchronous rectifying elements being joined together at a common node;
  a first passive synchronous rectifier (SR) control circuit comprising:
   a first direct current (DC) voltage divider circuit electrically coupled between a first node of the secondary winding and the common node, the first DC voltage divider circuit having an output electrically connected to the first control node of the first synchronous rectifying element;
   a first alternating current (AC) voltage divider circuit electrically coupled between the first node of the secondary winding and the common node, the first AC voltage divider circuit having an output electrically connected to the first control node of the first synchronous rectifying element; and
   a first control node voltage limiter circuit electrically coupled between the first control node of the first synchronous rectifying element and the common node; and
  a second passive SR control circuit comprising:
   a second DC voltage divider circuit electrically coupled between a second node of the secondary winding and the common node, the second DC voltage divider circuit having an output electrically connected to the second control node of the second synchronous rectifying element;
   a second AC voltage divider circuit electrically coupled between the second node of the secondary winding and the common node, the second AC voltage divider circuit having an output electrically connected to the second control node of the second synchronous rectifying element; and
   a second control node voltage limiter circuit electrically coupled between the second control node of the second synchronous rectifying element and the common node.

20. The active-clamp forward converter of claim 19 wherein the first passive SR control circuit comprises a first peak current limiter circuit electrically coupled between the common node and the first node of the secondary winding, and the second passive SR control circuit comprises a second peak current limiter circuit electrically coupled between the common node and the second node of the secondary winding.

21. The active-clamp forward converter of claim 20 wherein the first peak current limiter circuit comprises a first resistor coupled in parallel with a first diode, and the second peak current limiter circuit comprises a second resistor coupled in parallel with a second diode.

22. The active-clamp forward converter of claim 19 wherein each of the first DC voltage divider circuit and the second DC voltage divider circuit comprises at least two resistors.

23. The active-clamp forward converter of claim 19 wherein the first AC voltage divider circuit comprises a capacitor and an internal capacitance of the first synchronous rectifying element, and the second AC voltage divider circuit comprises a capacitor and an internal capacitance of the second synchronous rectifying element.

24. The active-clamp forward converter of claim 19 wherein the first control node voltage limiter circuit comprises a first zener diode and a second zener diode electrically connected anode-to-anode with each other, and the second control node voltage limiter circuit comprises a third zener diode and a fourth zener diode electrically connected anode-to-anode with each other.

25. The active-clamp forward converter of claim 19 wherein the first control node voltage limiter circuit comprises:
   a first zener diode and a second zener diode each comprising an anode and a cathode, the cathode of the first zener diode electrically coupled to the first control node, the cathode of the second zener diode electrically coupled to the common node, and the anode of the first zener diode electrically coupled to the anode of the second zener diode; and
   the second control node voltage limiter circuit comprises:
      a third zener diode and a fourth zener diode each comprising an anode and a cathode, the cathode of the third zener diode electrically coupled to the second control node, the cathode of the fourth zener diode electrically coupled to the common node, and the anode of the third zener diode electrically coupled to the anode of the fourth zener diode.

* * * * *